US012632641B2

(12) United States Patent

Zhou et al.

(10) Patent No.: US 12,632,641 B2
(45) Date of Patent: May 19, 2026

(54) METHOD FOR DISPLAYING ELECTRONIC SIGN AND ELECTRONIC DEVICE

(71) Applicants: BOE Intelligent IoT Technology Co.,LTD., Beijing (CN); BOE Technology Group Co., Ltd., Beijing (CN)

(72) Inventors: Kaiyuan Zhou, Beijing (CN); Linyi Fan, Beijing (CN); Mingwu Chen, Beijing (CN); Weihua Li, Beijing (CN)

(73) Assignees: BOE Intelligent IoT Technology Co., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 167 days.

(21) Appl. No.: 18/294,398

(22) PCT Filed: Jan. 3, 2023

(86) PCT No.: PCT/CN2023/070191
§ 371 (c)(1),
(2) Date: Feb. 1, 2024

(87) PCT Pub. No.: WO2023/155627
PCT Pub. Date: Aug. 24, 2023

(65) Prior Publication Data
US 2024/0338512 A1     Oct. 10, 2024

(30) Foreign Application Priority Data
Feb. 17, 2022     (CN) ......................... 202210146109.0

(51) Int. Cl.
*G06F 17/00* (2019.01)
*G06F 3/04845* (2022.01)
(Continued)

(52) U.S. Cl.
CPC ........ *G06F 40/106* (2020.01); *G06F 3/04845* (2013.01); *G06F 40/109* (2020.01);
(Continued)

(58) Field of Classification Search
CPC .. G06F 40/106; G06F 3/04845; G06F 40/109; G06F 40/177; G06F 3/0481;
(Continued)

(56) References Cited

U.S. PATENT DOCUMENTS

| | | | |
|---|---|---|---|
| 9,104,291 B2 * | 8/2015 | Kim ...................... | G06F 3/0481 |
| 9,715,326 B2 * | 7/2017 | Yuan ...................... | G06F 16/78 |

(Continued)

FOREIGN PATENT DOCUMENTS

| | | | | |
|---|---|---|---|---|
| CN | 102203722 B | * | 1/2015 | ........... G06F 3/1454 |
| CN | 106326251 A | | 1/2017 | |

(Continued)

OTHER PUBLICATIONS

CN112241491A English translation, published Jan. 19, 2021, pp. 1-22 (Year: 2021).*

(Continued)

*Primary Examiner* — Laurie A Ries
(74) *Attorney, Agent, or Firm* — Nath, Goldberg & Meyer; Joshua B. Goldberg

(57) ABSTRACT

Disclosed in the present disclosure are an electronic sign display method and an electronic device. The method includes determining conference information to be displayed and a first region in a display region of the electronic sign, wherein the conference information includes conference captions and conference contents corresponding to the conference captions; determining a quantity threshold of pieces of conference information being capable of being contained in the first region according to a size of the conference information and a size of the first region; and in (Continued)

response to the number of pieces of conference information to be displayed exceeding the quantity threshold, selecting pieces of conference information with a number less than or equal to the quantity threshold from a conference information queue to be displayed, and displaying the selected pieces of conference information in the first region.

15 Claims, 6 Drawing Sheets

(51) Int. Cl.

| | |
|---|---|
| *G06F 40/106* | (2020.01) |
| *G06F 40/109* | (2020.01) |
| *G06F 40/177* | (2020.01) |
| *G09F 9/30* | (2006.01) |
| G09G 3/34 | (2006.01) |

(52) U.S. Cl.
CPC .............. *G06F 40/177* (2020.01); *G09F 9/30* (2013.01); *G09G 3/3453* (2013.01); *G09G 2340/04* (2013.01); *G09G 2340/14* (2013.01); *G09G 2354/00* (2013.01); *G09G 2380/06* (2013.01)

(58) Field of Classification Search
CPC ...... G06F 3/04842; G06F 9/451; G06F 9/546; G09F 9/30; G09F 9/37; G09G 3/3453; G09G 2340/04; G09G 2340/14; G09G 2354/00; G09G 2380/06
See application file for complete search history.

(56) References Cited

U.S. PATENT DOCUMENTS

| | | | |
|---|---|---|---|
| 9,959,416 B1 | 5/2018 | Ho et al. | |
| 10,642,574 B2 * | 5/2020 | Fleizach ................. | G06F 3/167 |
| 2002/0047866 A1 | 4/2002 | Matsumoto et al. | |
| 2007/0136692 A1 * | 6/2007 | Seymour ................ | G06Q 10/10 |
| | | | 707/999.001 |
| 2007/0283285 A1 * | 12/2007 | Buchmann .............. | G06F 9/451 |
| | | | 715/764 |
| 2010/0079490 A1 | 4/2010 | Terazono et al. | |
| 2013/0016281 A1 * | 1/2013 | Sato ....................... | H04N 21/84 |
| | | | 348/468 |

| | | | |
|---|---|---|---|
| 2013/0132876 A1 * | 5/2013 | Kobayashi ............ | G06F 3/0486 |
| | | | 715/769 |
| 2014/0149858 A1 * | 5/2014 | Vecera .................. | G06F 40/103 |
| | | | 715/273 |
| 2014/0281997 A1 * | 9/2014 | Fleizach ................ | G06F 3/167 |
| | | | 715/720 |
| 2014/0380155 A1 * | 12/2014 | Kim ........................ | G06F 3/016 |
| | | | 715/702 |
| 2015/0268835 A1 * | 9/2015 | Hirano ................. | G06Q 10/101 |
| | | | 715/751 |
| 2018/0143956 A1 * | 5/2018 | Skarbovsky .......... | G06F 40/166 |
| 2020/0195882 A1 * | 6/2020 | Yi ........................... | G06V 10/25 |
| 2021/0357169 A1 * | 11/2021 | Hulbert ................. | G06F 3/0482 |
| 2022/0021717 A1 * | 1/2022 | Schrantz ............. | G11B 27/031 |
| 2022/0100330 A1 * | 3/2022 | Al Majid ............... | H04L 51/52 |
| 2024/0004541 A1 * | 1/2024 | Li ........................ | G06F 16/9535 |
| 2024/0338121 A1 * | 10/2024 | Yang ................... | G06F 3/03545 |

FOREIGN PATENT DOCUMENTS

| | | | | | |
|---|---|---|---|---|---|
| CN | 107911734 A | | 4/2018 | | |
| CN | 108170397 A | | 6/2018 | | |
| CN | 109308155 A | | 2/2019 | | |
| CN | 109710121 A | | 5/2019 | | |
| CN | 109725960 A | | 5/2019 | | |
| CN | 111190677 A | | 5/2020 | | |
| CN | 111290728 A | | 6/2020 | | |
| CN | 112241491 A | * | 1/2021 | ......... | G06F 16/9577 |
| CN | 108881429 B | * | 5/2021 | ............ | H04L 65/75 |
| CN | 113240448 A | | 8/2021 | | |
| CN | 213935504 U | | 8/2021 | | |
| CN | 113641321 A | * | 11/2021 | .......... | G06F 3/1446 |
| CN | 114510172 A | | 5/2022 | | |
| CN | 114785976 A | * | 7/2022 | ............ | G10L 25/57 |
| JP | 20099069895 A | | 4/2009 | | |
| JP | 2010262559 A | | 11/2010 | | |
| JP | 2016004342 A | | 1/2016 | | |
| WO | WO-2017116216 A1 | * | 7/2017 | ............ | G06F 21/32 |

OTHER PUBLICATIONS

CN114785976A English translation, published Jul. 22, 2022, pp. 1-14 (Year: 2022).*

Office Action dated May 16, 2024 issued in corresponding Chinese Application No. 202210146109.0.

* cited by examiner

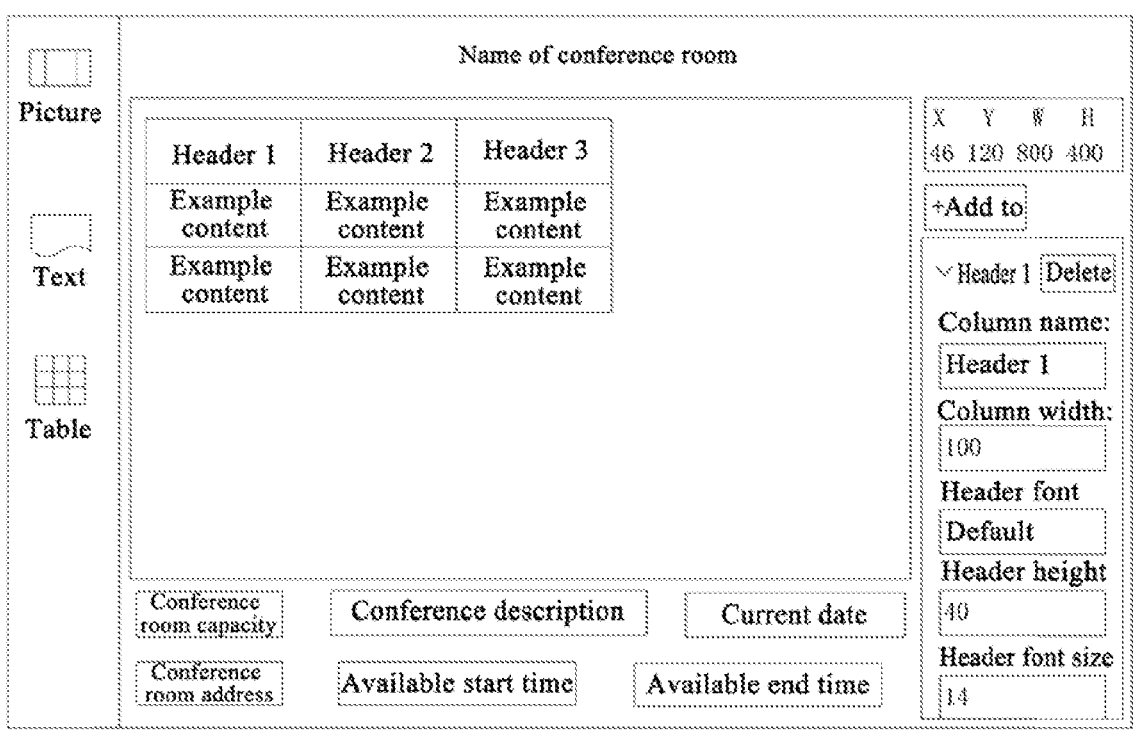

FIG. 1

| Conference name | conference subject | Start time | End time | Contact |
|---|---|---|---|---|
| test01 | Weekly Project Meeting | 09: 15 | 10: 00 | somebody |
| test02 | Weekly Project Meeting | 09: 15 | 10: 00 | somebody |
| test03 | Weekly Project Meeting | 09: 15 | 10: 00 | somebody |
| test04 | Weekly Project Meeting | 09: 15 | 10: 00 | somebody |
| test05 | Weekly Project Meeting | 09: 15 | 10: 00 | somebody |
| test06 | Weekly Project Meeting | 09: 15 | 10: 00 | somebody |
| test07 | Weekly Project Meeting | 09: 15 | 10: 00 | somebody |
| test08 | Weekly Project Meeting | 09: 15 | 10: 00 | somebody |

Name of conference room room capacity | The conference room is equipped with 3 all-in-one machines and other equipments

FIG. 2

Name of conference room

| Conference name | conference subject | Start time | End time | Contact |
|---|---|---|---|---|
| test01 | Weekly Project Meeting | 09: 15 | 10: 00 | somebody |
| test02 | Weekly Project Meeting | 09: 15 | 10: 00 | somebody |
| test03 | Weekly Project Meeting | 09: 15 | 10: 00 | somebody |
| test04 | Weekly Project Meeting | 09: 15 | 10: 00 | somebody |
| test05 | Weekly Project Meeting | 09: 15 | 10: 00 | somebody |
| test06 | Weekly Project Meeting | 09: 15 | 10: 00 | somebody |
| test07 | Weekly Project Meeting | 09: 15 | 10: 00 | somebody |
| test08 | Weekly Project Meeting | 09: 15 | 10: 00 | somebody |

| Conference room capacity | Conference room capacity:The conference room is equipped with 3 all-in-one machines and other equipments |
|---|---|

FIG. 5

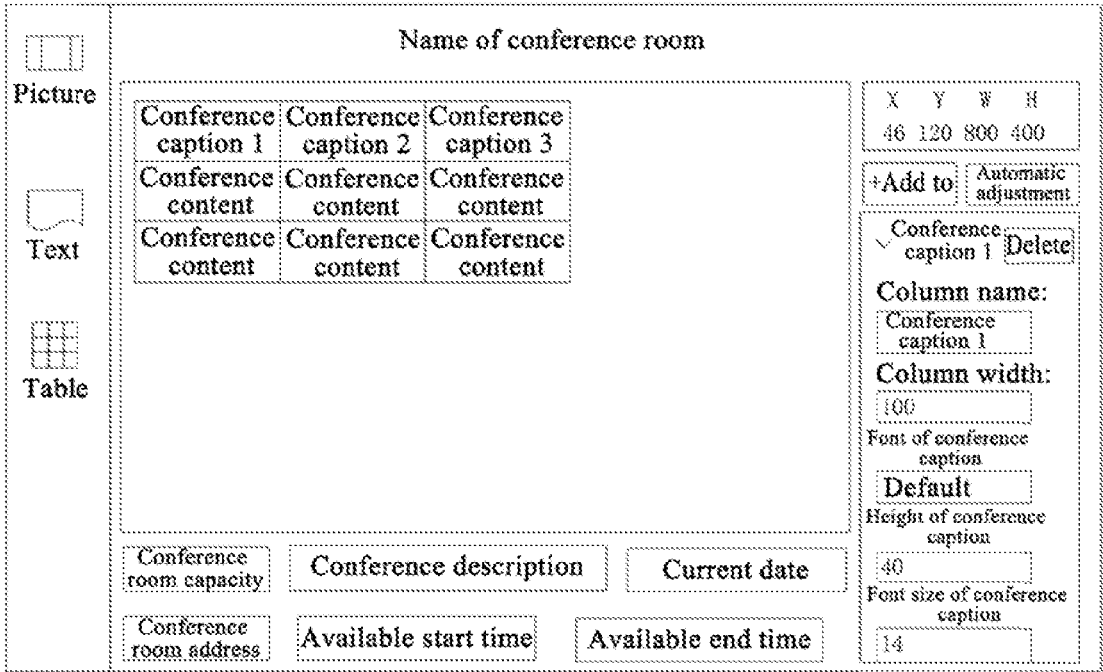

METHOD FOR DISPLAYING ELECTRONIC SIGN AND ELECTRONIC DEVICE

CROSS-REFERENCE TO RELATED PATENT APPLICATION

This is a National Phase Application filed under 35 U.S.C. 371 as a national stage of PCT/CN2023/070191, filed Jan. 3, 2023, an application claiming the benefit of Chinese Application No. 202210146109.0, filed Feb. 17, 2022, the content of each of which is hereby incorporated by reference in its entirety.

FIELD OF THE DISCLOSURE

The present disclosure relates to the field of electronic sign technology, and in particular, to a method for displaying an electronic sign and an electronic device.

BACKGROUND OF THE DISCLOSURE

An electronic sign product, such as an EPD sign (which is a display screen using electronic paper display technology), is an electronic display device with information transceiving function, capable of replacing the traditional paper sign, and in generally used in different usage scenarios such as intelligent retail, intelligent office, intelligent transportation, etc. For conference office scenes, traditional electronic sign products include conference doorplates, table cards, desk name plates, and the like.

At present, a traditional electronic sign management system can realize the formation and issue of display contents. However, in terms of displaying conference doorplates, there is a problem of mismatch between the display of the conference data and the focusing frame when there are many conference schedules, wherein the focusing frame is a region for displaying the conference data in the conference doorplate. With the increase of conference data, the displayed conference data exceeds the focusing frame and automatically covers the displayed content in the focusing frame, leading to the disordered typesetting.

SUMMARY OF THE DISCLOSURE

The present disclosure provides a method for displaying an electronic sign and an electronic device, for solving the problem of disordered typesetting of conference information caused by the fact that excessive conference information exceeds a focusing frame and automatically covers the display content in the focusing frame.

As a first aspect, an embodiment of the present disclosure provides a method for displaying an electronic sign, including: determining conference information to be displayed and a first region in a display region of the electronic sign, wherein the conference information comprises conference captions and conference contents corresponding to the conference captions; determining a quantity threshold of pieces of conference information being capable of being contained in the first region according to a size of the conference information and a size of the first region; and in response to the number of pieces of conference information to be displayed exceeding the quantity threshold, selecting pieces of conference information with a number less than or equal to the quantity threshold from a conference information queue to be displayed, and displaying the selected pieces of conference information in the first region.

As an optional implementation, the size of the conference information is determined by: determining the size of the conference information according to the received caption widths and caption heights of the conference captions and content heights of the conference contents corresponding to the conference captions input by a user.

As an optional implementation, determining the size of the conference information includes: determining an overall width of the conference information according to the caption widths of the conference captions, wherein a width of the conference content corresponding to each conference caption is the caption width of the conference caption; determining an overall height of the conference information according to a maximum caption height, a maximum content height and the number of the pieces of conference information; and determining the size of the conference information according to the overall width and the overall height.

As an optional implementation, after determining the size of the conference information, the method further includes: updating the overall height of the conference information according to the received caption font of at least one conference caption input by the user; and/or updating the overall height of the conference information according to the received content font of the conference content corresponding to at least one conference caption input by the user.

As an optional implementation, the updating the overall height of the conference information according to the received caption font of the at least one conference caption input by the user includes: in response to an overall height of the caption font input by the user exceeding the caption height of the conference caption corresponding to the caption font input by the user, increasing the caption height of the corresponding conference caption, so that the caption font is completely displayed in a cell with the increased caption height; or in response to an overall height of the caption font input by the user being lower than a preset percentage of the caption height of the conference caption corresponding to the caption font input by the user, decreasing the caption height of the corresponding conference caption, so that the decreased caption height is matched with the overall height of the caption font.

As an optional implementation, updating the overall height of the conference information according to the received content font of the conference content corresponding to at least one conference caption input by the user includes: in response to an overall height of the content font input by the user exceeding the content height of the conference content corresponding to the content font input by the user, increasing the content height of the corresponding conference content, so that the caption font is completely displayed in a cell with the increased content height; or in response to the overall height of the content font input by the user being lower than a preset percentage of the content height of the conference content corresponding to the content font input by the user, decreasing the content height of the corresponding conference content, so that the decreased content height is matched with the overall height of the caption font.

As an optional implementation, after determining the size of the conference information the method further includes: updating the caption width of each conference caption of the conference information according to a width of the first region and the overall width of the conference information; or updating the caption width of each conference caption of the conference information according to a width of the first region and a quantity of the conference captions in the conference information.

As an optional implementation, updating the caption width of each conference caption of the conference information according to the width of the first region and the overall width of the conference information includes: in response to the overall width of the conference information exceeding the width of the first region, compressing the caption width of each conference caption according to a preset proportion, so that the overall width of the compressed conference information is matched with the width of the first region.

As an optional implementation, updating the caption width of each conference caption of the conference information according to the width of the first region and the quantity of the conference captions in the conference information includes: in response to the quantity of the conference captions in the conference information being less than a caption threshold, dividing the width of the first region by the quantity of the conference captions to obtain an average caption width of the conference captions.

As an optional implementation, determining the quantity threshold of the pieces of conference information being capable of being contained in the first region according to the size of the conference information and the size of the first region includes: determining the quantity threshold of the pieces of conference information being capable of being contained in the first region, according to a maximum caption height of the caption heights of the conference captions in the conference information, a maximum content height of the content heights of the conference contents corresponding to the conference captions, and a height of the first region.

As an optional implementation, after determining the conference information to be displayed and the first region in the display region of the electronic sign, the method further includes: in response to an automatic adjustment instruction triggered by a user, updating the caption width of each conference caption in the conference information based on a width of the first region, so that the width of the first region is matched with an overall width of the conference information.

As an optional implementation, the conference information is displayed in form of a table, the conference captions in the conference information are distributed in a same row and in different columns, and the conference contents corresponding to the same conference caption are in the same column as the conference caption; wherein a row height of the conference caption in the table is determined according to a maximum caption height of caption heights of the conference captions; the width of the other cells in other rows of the table except the row where the conference captions are located is determined according to a maximum content width of the content widths (i.e., a width of the conference content) of the conference contents in the other rows; and a column width in the table is determined according to the caption width of each conference caption.

As an optional implementation, the size of the conference information is determined by: determining the size of the conference information according to the received caption heights and caption widths of the conference captions and content widths of the conference contents corresponding to the conference captions input by the user.

As an optional implementation, determining the size of the conference information includes: determining an overall height of the conference information according to the caption heights of the conference captions, wherein a height of the conference content corresponding to each conference caption is the caption height of the conference caption;

determining an overall width of the conference information according to a maximum caption width, a maximum content width and the number of the pieces of conference information; and determining the size of the conference information according to the overall width and the overall height.

As an optional implementation, after determining the size of the conference information, the method further includes: updating the overall width of the conference information according to the received caption font of conference captions input by the user; and/or updating the overall width of the conference information according to the received content font of the conference content corresponding to the conference captions input by the user.

As an optional implementation, the updating the overall width of the conference information according to the received caption font of the conference captions input by the user includes: in response to an overall width of the caption font exceeding the caption width of the conference caption corresponding to the caption font, increasing the caption width of the corresponding conference caption, so that the caption font is completely displayed in a cell with the increased caption width; or in response to an overall width of the caption font being lower than a preset percentage of the caption width of the conference caption corresponding to the caption font, decreasing the caption width of the corresponding conference caption, so that the decreased caption width is matched with the overall width of the caption font.

As an optional implementation, updating the overall width of the conference information according to the received content font of the conference content corresponding to conference captions input by the user includes: in response to an overall width of the content font exceeding the content width of the conference content corresponding to the content font, increasing the content width of the corresponding conference content, so that the caption font is completely displayed in a cell with the increased content width; or in response to the overall width of the content font being lower than a preset percentage of the content width of the conference content corresponding to the content font, decreasing the content width of the corresponding conference content, so that the decreased content width is matched with the overall width of the content font.

As an optional implementation, after determining the size of the conference information, the method further includes: updating the caption height of each conference caption of the conference information according to a height of the first region and the overall height of the conference information; or updating the caption height of each conference caption of the conference information according to a height of the first region and a quantity of the conference captions in the conference information.

As an optional implementation, updating the caption height of each conference caption of the conference information according to the height of the first region and the overall height of the conference information includes: in response to the overall width of the conference information exceeding the width of the first region, compressing the caption width of each conference caption according to a preset proportion, so that the overall width of the compressed conference information is matched with the width of the first region.

As an optional implementation, updating the caption height of each conference caption of the conference information according to the height of the first region and the quantity of the conference captions in the conference information includes: in response to the quantity of the conference captions in the conference information being less than a caption threshold, dividing the height of the first region by the quantity of the conference captions to obtain the average caption height of the conference captions.

As an optional implementation, determining the quantity threshold of the pieces of conference information being capable of being contained in the first region according to the size of the conference information and the size of the first region includes: determining the quantity threshold of the pieces of conference information being capable of being contained in the first region, according to a maximum caption width of the caption widths of the conference captions in the conference information, a maximum content width of the content widths of the conference contents corresponding to the conference captions, and a width of the first region.

As an optional implementation, after determining the conference information to be displayed and the first region in the display region of the electronic sign, the method further includes: in response to an automatic adjustment instruction triggered by a user, updating the caption height of each conference caption in the conference information based on a height of the first region, so that the height of the first region is matched with an overall height of the conference information.

As an optional implementation, the conference information is displayed in form of a table, the conference captions in the conference information are distributed in a same column and in different rows, and the conference contents corresponding to the same conference caption are in the same row as the conference caption; wherein a column width of the conference caption in the table is determined according to a maximum caption width of the conference captions; the width of the other cells in other columns of the table except the column where the conference captions are located is determined according to a maximum content width of the content widths of the conference contents in the other columns; and a row height in the table is determined according to the caption height of each conference caption.

As an optional implementation, selecting the pieces of conference information with the quantity less than or equal to the quantity threshold from the conference information queue to be displayed, and displaying the selected pieces of conference information in the first region includes: periodically removing the finished conference information from the conference information queue to be displayed; and selecting the pieces of conference information with a quantity less than or equal to the quantity threshold and with the higher ranking in the conference start time from the remaining conference information queue and displaying the selected conference information in the first region.

As an optional implementation, determining the size of the first region includes: determining the size of the first region according to a received height and a width of the first region input by a user; or in response to a drag operation instruction on the first region from a user, determining the size of the first region according to a preset initial size of the first region and a scaling corresponding to the drag operation instruction.

As a second aspect, the present disclosure provides an electronic device, including a processor and a memory for storing programs executable by the processor, and the processor is configured to read the programs in the memory and execute the following steps: determining conference information to be displayed and a first region in a display region of the electronic sign, wherein the conference information comprises conference captions and conference contents corresponding to the conference captions; determining a quantity threshold of pieces of conference information being capable of being contained in the first region according to a size of the conference information and a size of the first region; and in response to the number of pieces of conference information to be displayed exceeding the quantity threshold, selecting pieces of conference information with a number less than or equal to the quantity threshold from a conference information queue to be displayed, and displaying the selected pieces of conference information in the first region.

As an optional implementation, the processor is specifically configured to determine the size of the conference information by: determining the size of the conference information according to the received caption widths and caption heights of the conference captions and content heights of the conference contents corresponding to the conference captions input by the user.

As an optional implementation, the processor is specifically configured to determine an overall width of the conference information according to the caption widths of the conference captions, wherein a width of the conference content corresponding to each conference caption is the caption width of the conference caption; determine an overall height of the conference information according to a maximum caption height, a maximum content height and the number of the pieces of conference information; and determine the size of the conference information according to the overall width and the overall height.

As an optional implementation, after determining the size of the conference information, the processor is specifically configured to: update the overall height of the conference information according to the received caption font of at least one conference caption input by the user; and/or update the overall height of the conference information according to the received content font of the conference content corresponding to at least one conference caption input by the user.

As an optional implementation, the processor is specifically configured to: in response to an overall height of the caption font input by the user exceeding the caption height of the conference caption corresponding to the caption font input by the user, increase the caption height of the corresponding conference caption, so that the caption font is completely displayed in a cell with the increased caption height; or in response to an overall height of the caption font input by the user being lower than a preset percentage of the caption height of the conference caption corresponding to the caption font input by the user, decrease the caption height of the corresponding conference caption, so that the decreased caption height is matched with the overall height of the caption font.

As an optional implementation, the processor is specifically configured to: in response to an overall height of the content font input by the user exceeding the content height of the conference content corresponding to the content font input by the user, increase the content height of the corresponding conference content, so that the caption font is completely displayed in a cell with the increased content height; or in response to the overall height of the content font input by the user being lower than a preset percentage of the content height of the conference content corresponding to the content font input by the user, decrease the content height of the corresponding conference content, so that the decreased content height is matched with the overall height of the caption font.

As an optional implementation, after determining the size of the conference information, the processor is specifically configured to: update the caption width of each conference caption of the conference information according to a width of the first region and the overall width of the conference information; or update the caption width of each conference caption of the conference information according to a width of the first region and a quantity of the conference captions in the conference information.

As an optional implementation, the processor is specifically configured to: in response to the overall width of the conference information exceeding the width of the first region, compress the caption width of each conference caption according to a preset proportion, so that the overall width of the compressed conference information is matched with the width of the first region.

As an optional implementation, the processor is specifically configured to: in response to the quantity of the conference captions in the conference information being less than a caption threshold, divide the width of the first region by the quantity of the conference captions to obtain the average caption width of the conference captions.

As an optional implementation, the processor is specifically configured to: determine the quantity threshold of the pieces of conference information being capable of being contained in the first region, according to a maximum caption height of the caption heights of the conference captions in the conference information, a maximum content height of the content heights of the conference contents corresponding to the conference captions, and a height of the first region.

As an optional implementation, after determining the conference information to be displayed and the first region in the display region of the electronic sign, the processor is specifically configured to: in response to an automatic adjustment instruction triggered by a user, update the caption width of each conference caption in the conference information based on a width of the first region, so that the width of the first region is matched with an overall width of the conference information.

As an optional implementation, the conference information is displayed in form of a table, the conference captions in the conference information are distributed in a same row and in different columns, and the conference contents corresponding to the same conference caption are in the same column as the conference caption; wherein a row height of the conference caption in the table is determined according to a maximum caption height of the conference captions; the width of the other cells in other rows of the table except the row where the conference captions are located is determined according to a maximum content width of the content widths of the conference contents in the other rows; and a column width in the table is determined according to the caption width of each conference caption.

As an optional implementation, the processor is specifically configured to determine the size of the conference information by: determining the size of the conference information according to the received caption heights and caption widths of the conference captions and content widths of the conference contents corresponding to the conference captions input by the user.

As an optional implementation, the processor is specifically configured to determine an overall height of the conference information according to the caption heights of the conference captions, wherein a height of the conference content corresponding to each conference caption is the caption height of the conference caption; determine an overall width of the conference information according to a maximum caption width, a maximum content width and the number of the pieces of conference information; and determine the size of the conference information according to the overall width and the overall height.

As an optional implementation, after determining the size of the conference information, the processor is specifically configured to: update the overall width of the conference information according to the received caption font of conference captions input by the user; and/or update the overall width of the conference information according to the received content font of the conference content corresponding to conference captions input by the user.

As an optional implementation, the processor is specifically configured to: in response to an overall width of the caption font exceeding the caption width of the conference caption corresponding to the caption font, increase the caption width of the corresponding conference caption, so that the caption font is completely displayed in a cell with the increased caption width; or in response to an overall width of the caption font being lower than a preset percentage of the caption width of the conference caption corresponding to the caption font, decrease the caption width of the corresponding conference caption, so that the decreased caption width is matched with the overall width of the caption font.

As an optional implementation, the processor is specifically configured to: in response to an overall width of the content font exceeding the content width of the conference content corresponding to the content font, increase the content width of the corresponding conference content, so that the caption font is completely displayed in a cell with the increased content width; or in response to the overall width of the content font being lower than a preset percentage of the content width of the conference content corresponding to the content font, decrease the content width of the corresponding conference content, so that the decreased content width is matched with the overall width of the content font.

As an optional implementation, after determining the size of the conference information, the processor is specifically configured to: update the caption height of each conference caption of the conference information according to a height of the first region and the overall height of the conference information; or update the caption height of each conference caption of the conference information according to a height of the first region and a quantity of the conference captions in the conference information.

As an optional implementation, the processor is specifically configured to: in response to the overall width of the conference information exceeding the width of the first region, compress the caption width of each conference caption according to a preset proportion, so that the overall width of the compressed conference information is matched with the width of the first region.

As an optional implementation, the processor is specifically configured to: in response to the quantity of the conference captions in the conference information being less than a caption threshold, divide the height of the first region by the quantity of the conference captions to obtain the average caption height of the conference captions.

As an optional implementation, the processor is specifically configured to: determine the quantity threshold of the pieces of conference information being capable of being contained in the first region, according to a maximum caption width of the caption widths of the conference captions in the conference information, a maximum content width of the content widths of the conference contents corresponding to the conference captions, and a width of the first region.

As an optional implementation, after determining the conference information to be displayed and the first region in the display region of the electronic sign, the processor is specifically configured to: in response to an automatic adjustment instruction triggered by a user, update the caption height of each conference caption in the conference information based on a height of the first region, so that the height of the first region is matched with an overall height of the conference information.

As an optional implementation, the conference information is displayed in form of a table, the conference captions in the conference information are distributed in a same column and in different rows and the conference contents corresponding to the same conference caption are in the same row as the conference caption; wherein a column width of the conference caption in the table is determined according to a maximum caption width of the conference captions; the width of the other cells in other columns of the table except the column where the conference captions are located is determined according to a maximum content width of the content widths of the conference contents in the other columns; and a row height in the table is determined according to the caption height of each conference caption.

As an optional implementation, the processor is specifically configured to: periodically remove the finished conference information from the conference information queue to be displayed; and select the pieces of conference information with a quantity less than or equal to the quantity threshold and with the higher ranking in the conference start time from the remaining conference information queue and displaying the selected conference information in the first region.

As an optional implementation, the processor is specifically configured to determine the size of the first region by: determining the size of the first region according to a received height and a width of the first region input by a user; or in response to a drag operation instruction on the first region from a user, determining the size of the first region according to a preset initial size of the first region and a scaling corresponding to the drag operation instruction.

As a third aspect, the present disclosure provide a device for displaying an electronic sign, including: a region determination unit configured to determine conference information to be displayed and a first region in a display region of the electronic sign, wherein the conference information comprises conference captions and conference contents corresponding to the conference captions; a quantity determination unit configured to determine a quantity threshold of pieces of conference information being capable of being contained in the first region according to a size of the conference information and a size of the first region; a selection display unit configured to in response to the number of pieces of conference information to be displayed exceeding the quantity threshold, select pieces of conference information with a number less than or equal to the quantity threshold from a conference information queue to be displayed, and display the selected pieces of conference information in the first region.

As an optional implementation, the quantity determination unit is configured to determine the size of the conference information by: determining the size of the conference information according to the received caption widths and caption heights of the conference captions and content heights of the conference contents corresponding to the conference captions input by the user.

As an optional implementation, the quantity determination unit is configured to determine an overall width of the conference information according to the caption widths of the conference captions, wherein a width of the conference content corresponding to each conference caption is the caption width of the conference caption; determine an overall height of the conference information according to a maximum caption height, a maximum content height and the number of the pieces of conference information; and determine the size of the conference information according to the overall width and the overall height.

As an optional implementation, the device further includes a first updating unit, which is configured to: after determining the size of the conference information, update the overall height of the conference information according to the received caption font of at least one conference caption input by the user; and/or update the overall height of the conference information according to the received content font of the conference content corresponding to at least one conference caption input by the user.

As an optional implementation, the first updating unit is configured to: in response to an overall height of the caption font input by the user exceeding the caption height of the conference caption corresponding to the caption font input by the user, increase the caption height of the corresponding conference caption, so that the caption font is completely displayed in a cell with the increased caption height; or in response to an overall height of the caption font input by the user being lower than a preset percentage of the caption height of the conference caption corresponding to the caption font input by the user, decrease the caption height of the corresponding conference caption, so that the decreased caption height is matched with the overall height of the caption font.

As an optional implementation, the first updating unit is configured to: in response to an overall height of the content font input by the user exceeding the content height of the conference content corresponding to the content font input by the user, increase the content height of the corresponding conference content, so that the caption font is completely displayed in a cell with the increased content height; or in response to the overall height of the content font input by the user being lower than a preset percentage of the content height of the conference content corresponding to the content font input by the user, decrease the content height of the corresponding conference content, so that the decreased content height is matched with the overall height of the caption font.

As an optional implementation, the device further includes a second updating unit, which is configured to: after determine the size of the conference information, update the caption width of each conference caption of the conference information according to a width of the first region and the overall width of the conference information; or update the caption width of each conference caption of the conference information according to a width of the first region and a quantity of the conference captions in the conference information.

As an optional implementation, the second updating unit is configured to: in response to the overall width of the conference information exceeding the width of the first region, compress the caption width of each conference caption according to a preset proportion, so that the overall width of the compressed conference information is matched with the width of the first region.

As an optional implementation, the second updating unit is configured to: in response to the quantity of the conference captions in the conference information being less than a caption threshold, divide the width of the first region by the quantity of the conference captions to obtain the average caption width of the conference captions.

As an optional implementation, the quantity determination unit is configured to: determine the quantity threshold of the pieces of conference information being capable of being contained in the first region, according to a maximum caption height of the caption heights of the conference captions in the conference information, a maximum content height of the content heights of the conference contents corresponding to the conference captions, and a height of the first region.

As an optional implementation, the device further includes an automatic adjustment unit which is configured to: after determining the conference information to be displayed and the first region in the display region of the electronic sign, in response to an automatic adjustment instruction triggered by a user, update the caption width of each conference caption in the conference information based on a width of the first region, so that the width of the first region is matched with an overall width of the conference information.

As an optional implementation, the conference information is displayed in form of a table, the conference captions in the conference information are distributed in a same row and in different columns, and the conference contents corresponding to the same conference caption are in the same column as the conference caption; wherein a row height of the conference caption in the table is determined according to a maximum caption height of caption heights of the conference captions; the width of the other cells in other rows of the table except the row where the conference captions are located is determined according to a maximum content width of the content widths of the conference contents in the other rows; and a column width in the table is determined according to the caption width of each conference caption.

As an optional implementation, the quantity determination unit is configured to determine the size of the conference information by: determining the size of the conference information according to the received caption heights and caption widths of the conference captions and content widths of the conference contents corresponding to the conference captions input by the user.

As an optional implementation, the quantity determination unit is configured to determine an overall height of the conference information according to the caption heights of the conference captions, wherein a height of the conference content corresponding to each conference caption is the caption height of the conference caption; determine an overall width of the conference information according to a maximum caption width, a maximum content width and the number of the pieces of conference information; and determine the size of the conference information according to the overall width and the overall height.

As an optional implementation, the device further includes a first updating unit, which is specifically configured to: after determining the size of the conference information, update the overall width of the conference information according to the received caption font of conference captions input by the user; and/or update the overall width of the conference information according to the received content font of the conference content corresponding to the conference captions input by the user.

As an optional implementation, the first updating unit is configured to: in response to an overall width of the caption font exceeding the caption width of the conference caption corresponding to the caption font, increase the caption width of the corresponding conference caption, so that the caption font is completely displayed in a cell with the increased caption width; or in response to an overall width of the caption font being lower than a preset percentage of the caption width of the conference caption corresponding to the caption font, decrease the caption width of the corresponding conference caption, so that the decreased caption width is matched with the overall width of the caption font.

As an optional implementation, the first updating unit is configured to: in response to an overall width of the content font exceeding the content width of the conference content corresponding to the content font, increase the content width of the corresponding conference content, so that the caption font is completely displayed in a cell with the increased content width; or in response to the overall width of the content font being lower than a preset percentage of the content width of the conference content corresponding to the content font, decrease the content width of the corresponding conference content, so that the decreased content width is matched with the overall width of the caption font.

As an optional implementation, the device further includes a second updating unit, which is configure to: after determining the size of the conference information, update the caption height of each conference caption of the conference information according to a height of the first region and the overall height of the conference information; or update the caption height of each conference caption of the conference information according to a height of the first region and a quantity of the conference captions in the conference information.

As an optional implementation, the second updating unit is configured to: in response to the overall width of the conference information exceeding the width of the first region, compress the caption width of each conference caption according to a preset proportion, so that the overall width of the compressed conference information is matched with the width of the first region.

As an optional implementation, the second updating unit is configured to: in response to the quantity of the conference captions in the conference information being less than a caption threshold, divide the height of the first region by the quantity of the conference captions to obtain the average caption height of the conference captions.

As an optional implementation, the quantity determination unit is configured to: determine the quantity threshold of the pieces of conference information being capable of being contained in the first region, according to a maximum caption width of the caption widths of the conference captions in the conference information, a maximum content width of the content widths of the conference contents corresponding to the conference captions, and a width of the first region.

As an optional implementation, the device further includes an automatic adjustment unit which is configured to: after determining the conference information to be displayed and the first region in the display region of the electronic sign, update, in response to an automatic adjustment instruction triggered by a user, the caption height of each conference caption in the conference information based on a height of the first region, so that the height of the first region is matched with an overall height of the conference information.

As an optional implementation, the conference information is displayed in form of a table, the conference captions in the conference information are distributed in a same column and in different rows and the conference contents corresponding to the same conference caption are in the same row as the conference caption; wherein a column width of the conference caption in the table is determined according to a maximum caption width of the conference captions; the width of the other cells in other columns of the table except the column where the conference captions are located is determined according to a maximum content width of the content widths of the conference contents in the other columns; and a row height in the table is determined according to the caption height of each conference caption.

As an optional implementation, the selection display unit is configured to: periodically remove the finished conference information from the conference information queue to be displayed; and select the pieces of conference information with a quantity less than or equal to the quantity threshold and with the higher ranking in the conference start time from the remaining conference information queue and displaying the selected conference information in the first region.

As an optional implementation, the quantity determination unit is configured to determine the size of the first region by: determining the size of the first region according to a received height and a width of the first region input by a user; or in response to a drag operation instruction on the first region from a user, determining the size of the first region according to a preset initial size of the first region and a scaling corresponding to the drag operation instruction.

As a fourth aspect, an embodiment of the present disclosure provides a non-transitory computer storage medium having a computer program stored thereon, when executed by a processor, the program implements the steps of the method according to the first aspect.

These or other aspects disclosed herein will be more concise and understandable in the description of the following embodiments.

BRIEF DESCRIPTION OF THE DRAWINGS

In order to more clearly illustrate the technical solutions of the embodiments of the present disclosure, the drawings required to be used in the description of the embodiments will be briefly illustrated below. It is apparent that the drawings in the description below are only used for describing some embodiments of the present disclosure, and it is obvious for one of skilled in the art that other drawings may be obtained according to the these drawings without inventive work.

FIG. 1 is a schematic diagram showing an editing interface of a doorplate template in related art;

FIG. 2 is a schematic diagram showing that a conference information overflows out of a focusing frame according to an embodiment of the present disclosure;

FIG. 5 is a schematic diagram showing a display table of conference information according to an embodiment of the present disclosure;

FIG. 6 is a schematic diagram showing an automatic adjustment according to an embodiment of the present disclosure;

DETAILED DESCRIPTION OF THE EXEMPLARY EMBODIMENTS

Figure 3:
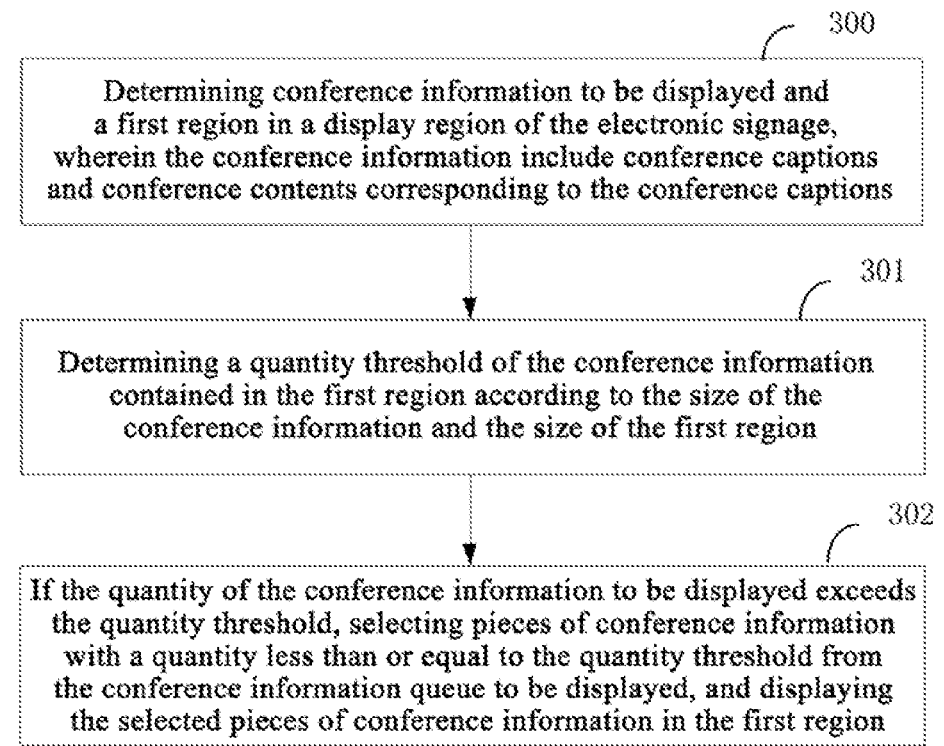
FIG. 3 is a flowchart showing an method for displaying an electronic sign according to an embodiment of the present disclosure.

In order to make the objects, technical solutions and advantages of the present disclosure more apparent, the present disclosure will be described in further detail with reference to the accompanying drawings. It is apparent that the described embodiments are only some embodiments of the present disclosure, not all embodiments. All other embodiments, which can be derived by one of skilled in the art from the embodiments disclosed herein without making any inventive effort, shall fall within the protection scope of the present disclosure.

The term "and/or" in the embodiments of the present disclosure describes an association relationship of associated objects, and indicates that three relationships may exist. For example, A and/or B may indicate: A exists alone, A and B exist simultaneously, and B exists alone. The character "/" generally indicates that the associated objects before "/" and after "/" are in an "or" relationship.

The application scenario described in the embodiment of the present disclosure is for more clearly illustrating the technical solution of the embodiment of the present disclosure, and does not form a limitation on the technical solution in the embodiment of the present disclosure. As known by one of skilled in the art, with the occurrence of a new application scenario, the technical solution in the embodiment of the present disclosure is also applicable to similar technical problems. In the description of the present disclosure, "a plurality" means two or more, unless otherwise specified.

The first embodiment: an electronic sign product, such as an EPD sign (which is a display screen employing the electronic paper display technology), is an electronic display device with information transceiving function, capable of replacing the traditional paper sign, and in generally used in different usage scenarios such as intelligent retail, intelligent office, intelligent transportation, etc. For conference office scenes, traditional electronic sign products include conference doorplates, table cards, desk name plates, and the like. At present, a traditional electronic sign management system can realize the formation and issue of display contents. However, in terms of displaying conference doorplates, there is a problem of mismatch between the display of the conference data and the focusing frame when there are many conference schedules, wherein the focusing frame is a region for displaying the conference data in the conference doorplate. With the increase of conference data, the displayed conference data exceeds the focusing frame and automatically covers the displayed content in the focusing frame, leading to the disordered typesetting.

As shown in FIG. 1, an embodiment of the present disclosure provides an existing doorplate template editing interface (an editing interface of a doorplate template in related art). A user automatically enters the doorplate template editing interface after the user selects a corresponding doorplate type. The middle frame is a focusing frame in which a table is displayed, and the added headers are created in columns. The header and the filling content below the header are separated from each other, and after a user selects a grid control or a table control, the user needs to set a conference caption (or conference title) of the header, conference content corresponding to the conference caption, and the sizes of the conference caption and the conference content. Since the size of the conference caption and the size of the conference content cannot be automatically changed after being set in related art, the conference information overflows the focusing frame when there are many conference information with the increasing of the quantity of the conferences, as shown in FIG. 2 which is a schematic diagram showing that the conference information overflows the focusing frame in the embodiment, so that the conference information covers the content below the conference information, thereby resulting the disordered typesetting. In addition, a gap exists between an edge of the list and the focusing frame, thereby resulting the poor user experience.

An embodiment of the present disclosure provides a method for displaying an electronic sign, the core idea of which is determining a quantity threshold of conference information that a first region is capable of accommodating according to a size of the conference information and a size of the first region, and displaying the conference information having a quantity less than or equal to the quantity threshold in the first region. Since the quantity threshold of the conference information that the first region is capable of accommodating is determined based on the size of the conference information and the size of the first region, displaying the quantity of conference information that can be accommodated in the first region avoids the problem of the disordered typesetting caused by the conference information overflowing the first region.

As shown in FIG. 3, an embodiment of the present disclosure provides a method for displaying an electronic sign, including steps 300 to 302.

At step 300, determining conference information to be displayed and a first region in a display region of the electronic sign, wherein the conference information includes conference captions and conference contents corresponding to the conference captions.

The electronic sign in the embodiment includes, but is not limited to, an EPD sign, and an electronic display device with a transceiving function for displaying conference information, such as an EPD doorplate, which is not limited to the embodiment.

In an implementation, the conference information to be displayed is determined in the embodiment. Specifically, the content, size, font size, font color, and font format of the conference information are determined. The first region is determined in the embodiment. Specifically, the size, background, display format, and the like of the first region are determined.

The conference information in the embodiment includes the conference captions and the conference contents corresponding to the conference captions. The conference captions included in different conference information in the embodiment may be the same or different, which is not limited in the embodiment. If the conference captions in different conference information are the same, the repeated conference captions are removed and only different conference captions are displayed when the conference captions are displayed in the first region. If the conference captions in different conference information are different from each other, all different conference captions are displayed in the first region. If no corresponding conference content exists under a certain conference caption, the display content is empty. In an implementation, the conference captions are not repeatedly displayed, and may be displayed in a row or a column in the first region, and specifically may be flexibly set according to the shape, the style, and the like of the electronic sign, which is not limited in the embodiment.

In some embodiments, the conference captions in the embodiment include, but are not limited to, the information related to the conference such as a conference name, a conference subject, a conference start time, a conference end time, conference contacts, and the like.

Optionally, the conference captions may be preset by the user, or may be extracted from the conference information input by the user, which is not limited in the embodiment.

At step 301, determining a quantity threshold of the conference information contained in the first region according to the size of the conference information and the size of the first region.

In some embodiments, the size of the conference information specifically refers to the overall height of all conference contents and the overall width of all conference contents. The conference content may be displayed in one or more rows. If the conference content corresponding to one conference caption in one piece of conference information is displayed in one cell, the overall height of the conference content specifically refers to the height of the cell containing the conference content, and the overall width of the conference content specifically refers to the width of the cell containing the conference content. The table lines of the cells may or may not be displayed, that is, the conference information may be displayed in a table manner, and the table lines may or may not be displayed in the first region, which is not limited in the embodiment. It should be noted that when the conference information is displayed in a table manner, the sizes of the cells of the table are the same.

In some embodiments, determining the size of the first region includes:

Mode 1) determining the size of the first region according to the height and width of the first region input by a user; or Mode 2) determining the size of the first region, in response to a drag operation instruction of a user to the first region, according to a preset initial size of the first region and a scaling corresponding to the drag operation instruction.

Figure 4:
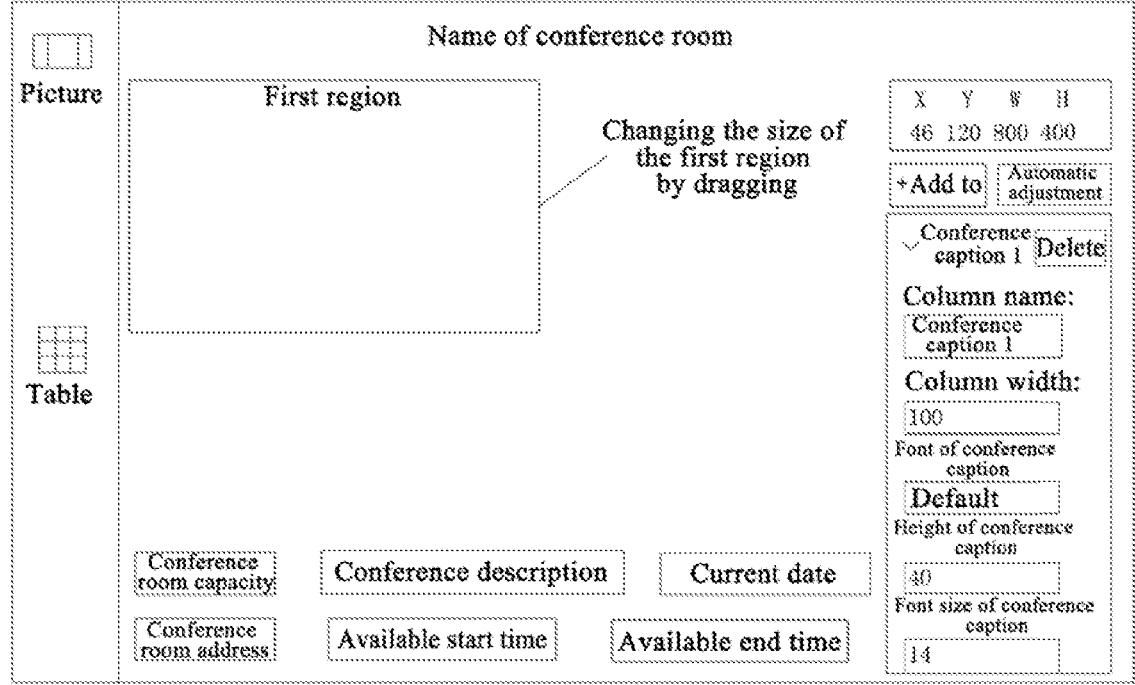
FIG. 4 is a schematic diagram showing an interface in which a height and width of a first region are set according to an embodiment of the present disclosure.

In an implementation, a user may set the height and width of the first region through a conference configuration interface. As shown in FIG. 4, an embodiment of the present disclosure provides an interface for configuring the height and width of the first region, where X and Y values represent coordinates of the first region in a display region, W values represent a width of an X axis, and H values represent a height of a Y axis. If the user changes the size of the first region in a dragging manner, the values of X, Y, W, H are updated according to the position and size of the dragged first region after the user stops dragging.

At step 302, if the quantity of the conference information to be displayed exceeds the quantity threshold, selecting pieces of conference information with a quantity less than or equal to the quantity threshold from the conference information queue to be displayed, and displaying the selected pieces of conference information in the first region.

In an implementation, if the quantity of the conference information to be displayed does not exceed the quantity threshold, all the conference information to be displayed are displayed in the first region.

In some embodiments, the conference information queue in the embodiment includes at least one piece of conference information to be displayed. If the conference information queue includes a plurality of pieces of conference information to be displayed, the plurality of pieces of conference information to be displayed are sequentially arranged according to a sequence of conference start times. When selecting conference information from the conference information queue, priority may be given to the pieces of conference information with the higher ranking for display.

In some embodiments, the conference information in the conference information queue may be also periodically updated in the present embodiment, so as to periodically update the conference information displayed in the first region. In an implementation, the conference information which is finished is periodically removed from the conference information queue to be displayed; and the pieces of conference information with a quantity less than or equal to the quantity threshold and with the higher ranking in the conference start time are selected from the remaining conference information queue and displayed in the first region.

In an implementation, when the quantity of the conference information exceeds the overall height of the first region, redundant data is abandoned, for example the finished conference information may be abandoned in a timing updating mode, and the ongoing conference information and the conferences in the conference information queue are displayed.

The conference information which is already finished may be periodically removed from the conference information queue, and then the pieces of conference information with a higher ranking in the conference starting time are selected from the remaining conference information queue, and the quantity of the selected pieces of conference information is smaller than or equal to the quantity threshold of the conference information that the first region is capable of accommodating in the present embodiments, so that the effectiveness of the displayed conference information can be ensured, and the use experience of the user can be improved.

In some embodiments, according to the horizontal display or vertical display of the conference information in the first region, the present embodiments provide a corresponding method for displaying the conference information, a method for determining a size of the conference information, a method for updating the size of the conference, and a method for determining the quantity threshold of the conference information that the first region is capable of accommodating, which will be described in detail in two cases.

Case 1: conference information is displayed horizontally in the first region.

Method 1a, the embodiment provides a method for displaying conference information.

In some implementations, as shown in FIG. 5, the conference information in the embodiment is displayed in a form of a table. Conference captions in the conference information are arranged in the same row and in different columns, and conference contents corresponding to the same conference caption are in the same column as the conference caption.

A height of the row where the conference captions are located in the table is determined according to a maximum height among the heights of the conference captions. The heights of the other cells in other rows of the table except the row where the conference captions are located are determined according to the maximum content height among the content heights of the conference contents in the other rows. A column width in the table is determined according to a width of each of the conference captions.

In an implementation, when the height of the row where all the conference captions are located is calculated, the maximum height of the heights of all the conference captions is taken for calculation. It is necessary to ensure that the overall height of the conference information is less than or equal to the height of the first region. When the heights of all the conference contents are calculated, the maximum height of the heights of all the conference contents is taken for calculation.

Method 1b, the embodiment provides a method for determining the size of conference information.

In some embodiments, determining the size of conference information includes:

Determining the size of the conference information, according to the received caption widths (i.e., a width of the conference caption) and caption heights (i.e., a height of the conference caption) of the conference captions input by the user and the content heights (i.e., a height of the conference content) of the conference contents corresponding to the conference captions.

In an implementation, since the conference information is displayed horizontally, each of the caption widths is determined as the column width (i.e., a width of the column) of the corresponding column in the table. After the widths of the conference captions are determined, the column widths of the columns of the table are determined, and at this time the column widths of the columns are not adjusted any more. The column width of each column in the table is determined based on the caption width of the conference caption in the column, and then the height of the table is determined further (i.e., based on the caption height and the content height).

In some embodiments, determining the size of the conference information specifically includes:

Firstly, determining the overall width of the conference information according to the widths of the conference captions, wherein a width of the conference content corresponding to each of the conference captions is the caption width of the conference caption. In an implementation, a sum of the caption widths of the conference captions is the overall width of the conference information. Optionally, the caption widths of the conference captions may be the same or different. The maximum caption width may be served as the caption width of each of the conference captions, or an average width of the caption widths may be served as the caption width of each of the conference captions, which is not limited to the embodiment.

Secondly, the overall height of the conference information is determined according to the maximum caption height, the maximum content height and the quantity of conference information. In an implementation, since the conference captions are displayed in a single row, the overall height of the conference information=the maximum caption height+the maximum content height×the quantity of conference information.

Finally, the size of the conference information is determined according to the overall width and the overall height.

Method 1c, the embodiment provides a method for updating the size of the conference information.

In some embodiments, after determining the size of the conference information, that is, after determining the row height and the column width of the table for displaying the conference information, the size of the conference information may be updated according to a caption font and/or a content font set by a user, which specifically includes:

Updating mode 1) updating the overall height of the conference information according to the received caption font of at least one conference caption input by a user.

In some embodiments, if the overall height of the caption font input by the user exceeds the caption height of the conference caption corresponding to the caption font input by the user, the caption height of the conference caption corresponding to the caption font is increased, so that the caption font is completely displayed in the cell with the increased caption height. The maximum caption height is updated based on the increased caption height, and the overall height of the conference information is updated based on the updated maximum caption height.

In some embodiments, if the overall height of the caption font input by the user is lower than a preset percentage of the caption height of the conference caption corresponding to the caption font input by the user, the caption height of the corresponding conference caption is decreased, so that the decreased caption height matches with the overall height of the caption font. The maximum caption height is updated based on the decreased caption height, and the overall height of the conference information is updated based on the updated maximum caption height.

Updating mode 2) updating the overall height of the conference information according to the received content font of the conference content corresponding to at least one conference caption input by the user.

In some embodiments, if the overall height of the content font input by the user exceeds the content height of the conference content corresponding to the content font input by the user, the content height of the conference content corresponding to the content font is increased, so that the caption font is completely displayed in the cell with the increased content height. The maximum content height is updated based on the increased content height, and the overall height of the conference information is updated based on the updated maximum content height.

In some embodiments, if the overall height of the content font input by the user is lower than a preset percentage of the content height of the conference content corresponding to the content font input by the user, the content height of the corresponding conference content is decreased, so that the decreased content height matches with the overall height of the content font. The maximum content height is updated based on the decreased content height, and the overall height of the conference information is updated based on the updated maximum content height.

Updating mode 3) updating the overall height of the conference information according to the received caption font of at least one conference caption and the content font of the conference content corresponding to the at least one conference caption that are input by the user.

The updating mode 3) is a combination of updating modes 1) and 2), and the specific implementation process of updating mode 3) may be referred to the above processes, which will not be described herein again.

In the updating modes of the embodiments, the font size set by the user has the highest priority. When the size of the caption font and the size of the content font set by the user are not matched with the heights of the cells where the caption font and the content font are located, the heights of the cells are updated, the maximum height among the updated heights of the cells is determined as the row height of the table, and the overall height of the conference information is adjusted adaptively.

Updating mode 4) updating the caption width of each conference caption of the conference information according to the width of the first region and the overall width of the conference information.

In some embodiments, if the overall width of the conference information exceeds the width of the first region, the caption width of each conference caption is compressed according to a preset proportion, so that the compressed overall width of the conference information matches with the width of the first region. The compression proportion is the same for the caption widths of the conference captions, i.e., equal-ratio compression. In an implementation, it is required that the overall width of the conference information is less or equal to the width of the first region. As the quantity (number) of columns where the conference captions are located increases, the column width of each column is automatically compressed.

Updating mode 5) updating the caption width of each conference caption of the conference information according to the width of the first region and the quantity of the conference captions in the conference information.

In some embodiments, if the quantity of conference captions in the conference information is smaller than a threshold of the conference captions (a caption threshold), the width of the first region is divided by the quantity of the conference captions to obtain the average width of the conference captions. In an implementation, for example, when the quantity of the conference captions is less than or equal to ten (i.e., 10) columns, the width of the first region is divided to obtain the column width of each of the columns in which the conference captions are located.

In some embodiments, the embodiment further provides an automatic adjustment manner, as shown in FIG. 6. An automatic adjustment button (i.e., a virtual button) is displayed on the conference configuration interface. The user may trigger the automatic adjustment button to implement the matching between the width of the first region and the overall width of the conference information.

In an implementation, after conference information to be displayed and the first region in the display region of the electronic sign are determined, updating, in response to an automatic adjustment instruction triggered by the user, the caption width of each of the conference captions in the conference information based on the width of the first region, so that the width of the first region matches with the overall width of the conference information. The automatic adjustment mainly includes two modes, one of the two modes is to compress the caption width of each of the conference captions according to a preset ratio if the overall width of the conference information exceeds the width of the first region; and the other of the two modes is to divide the width of the first region by the quantity of the conference captions to obtain an average caption width of the conference captions if the quantity of the conference captions in the conference information is smaller than a threshold of the conference captions.

The updating modes 1) to 3) and the updating modes 4) and 5) in the embodiments may be implemented in a combined manner, that is, any one of the updating modes 1) to 3) is combined with the updating mode 4), or the updating mode 5), which is not limited in the embodiment.

Method 1d, the present embodiment provides a method for determining a threshold of the number of pieces of conference information that the first region is capable of accommodating.

In some embodiments, the threshold of the number of pieces (i.e., the quantity threshold) of the conference information accommodated in the first region is determined according to the maximum caption height among the caption heights of the conference captions in the conference information, the maximum content height among the content heights of the conference contents corresponding to the conference captions, and the height of the first region.

In an implementation, the quantity threshold=(the height of the first region–the maximum caption height)/the maximum content height. If the obtained quantity threshold is a decimal, the number after the decimal point is directly discarded, that is, the quantity threshold is rounded down to a whole number.

The calculation logic in the embodiment is as follows: the user adjusts the size of the first region in a dragging mode after pulling a grid control; after the user sets conference related information such as a row height, a column width, a font and a background of the table, the set conference related information is uploaded at a web terminal; at a service platform, the quantity of conference information that may be displayed in the first region is calculated by subtracting the caption height (i.e., the maximum caption height among the caption heights) from the height of the first region, and then by dividing the difference by the maximum content height of the content height of the conference contents. With the calculation rule of discarding data after the decimal point, the result is rounded down to obtain the quantity threshold.

Figure 7:
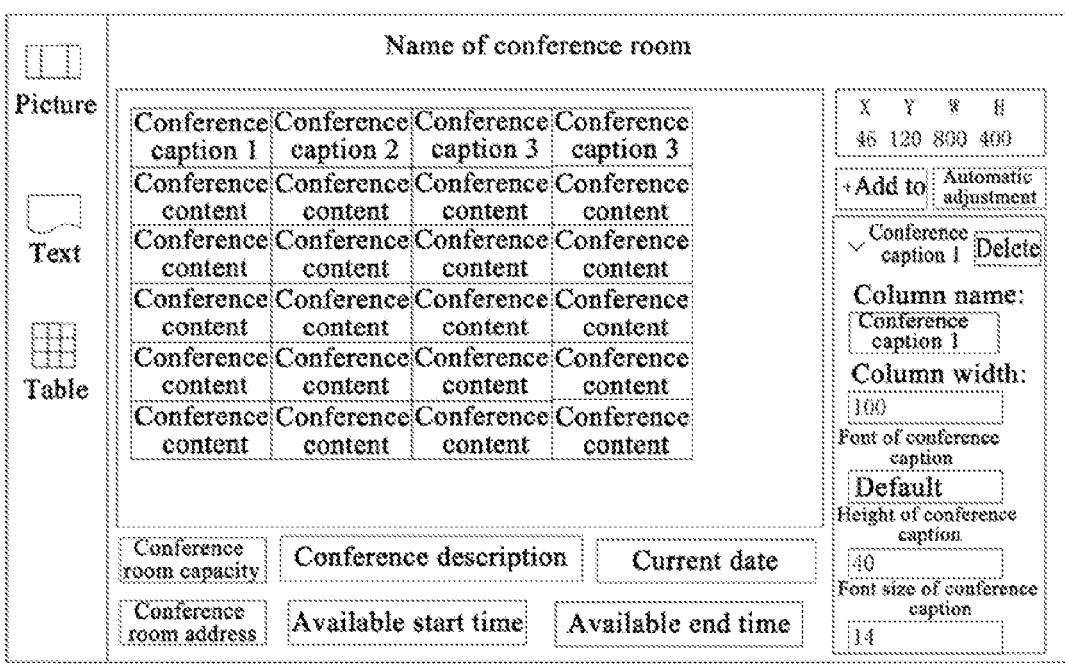
FIG. 7 is a schematic diagram showing a conference configuration interface according to an embodiment of the present disclosure.

As shown in FIG. 7, the embodiment provides a conference configuration interface, which uses a new calculation logic and adds an automatic adjustment function and a linkage function of the font and data regarding the row height.

After the user selects the grid control, the user firstly needs to adjust the size of the first region in a mode of dragging or modifying parameters by using a toolbar on the right side, and then the user sets the column width and the row height of the conference caption and conference content (i.e., the conference caption in a column and the conference content in the same column as the conference caption have the same column width), and finally the user sets the font sizes of the conference caption and the conference content. If the font size exceeds the preset height of the conference caption or the conference content, the value of the height of the conference caption or the conference content is automatically modified, and the user may check the caption height or the content height on the right side of the conference configuration interface in real time. The grid control creates the entire table according to the number of the columns. For example, it is default that the column width of the table is 160 and the height of the table is 40. When the number of the columns is less than or equal to 10, the width of the table and the width of the first region may be automatically matched each other by clicking the automatic adjustment button.

Case 2: the conference information is longitudinally displayed in the first region.

Method 2a, the embodiment provides a method for displaying conference information.

Figure 8:
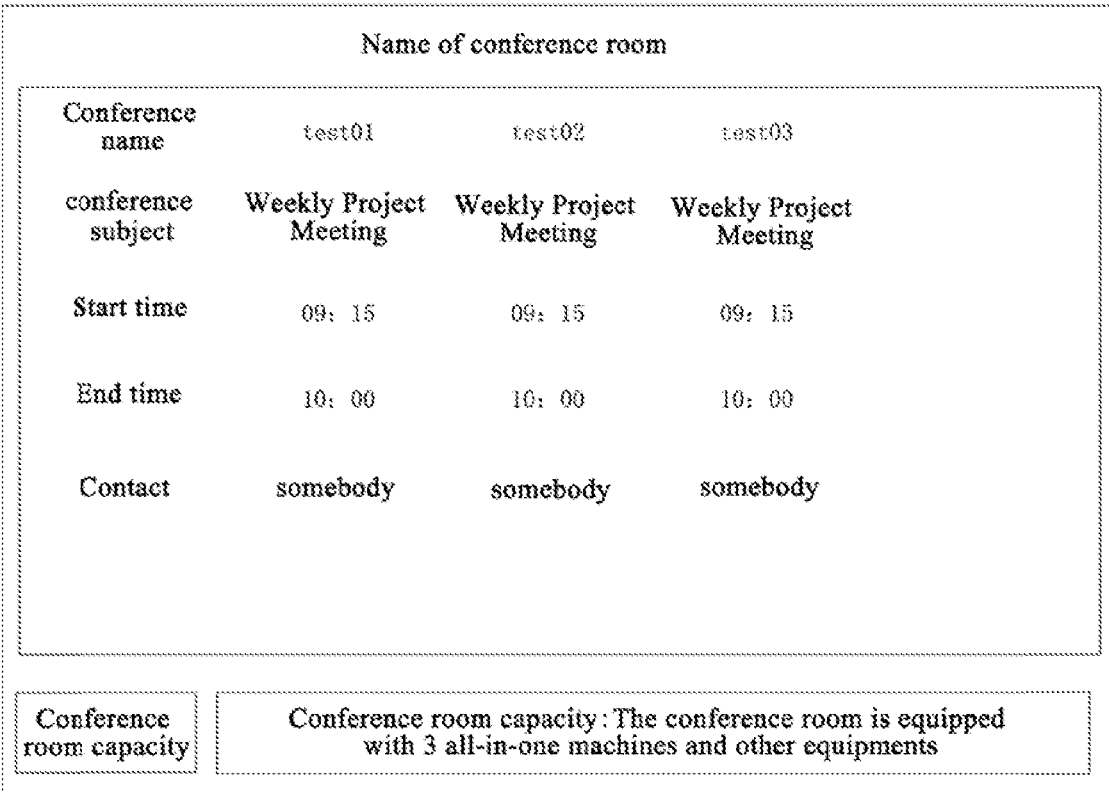
FIG. 8 is a schematic diagram showing a display table of conference information according to an embodiment of the present disclosure.

In some embodiments, as shown in FIG. 8, the conference information in the embodiment is displayed in a form of a table. Conference captions in the conference information are arranged in the same column and different rows, and conference contents corresponding to the same conference caption are in the same row as the conference caption.

The column width of the column in which the conference captions are located in the table is determined according to the maximum caption width among the caption widths of the conference captions. The width of the other cells in other columns of the table except the column where the conference captions are located is determined according to the maximum content width among the content widths of the conference contents in the other columns. The row height (i.e., a height of a row) in the table is determined according to the caption heights of the conference captions.

In an implementation, when the column width of the column where all the conference captions are located is calculated, the maximum width value of the widths of all the conference captions is taken for calculation. It is necessary to ensure that the overall width of the conference information is less than or equal to the width of the first region. When the column width of all conference contents is calculated, the maximum value of the widths of all conference contents is taken for calculation.

Method 2b, the embodiment provides a method for determining the size of conference information.

In some embodiments, determining the size of conference information includes:

Determining the size of the conference information according to the received caption heights and caption widths of the conference captions input by the user and the content widths of the conference contents corresponding to the conference captions.

In an implementation, since the conference information is displayed vertically, each of the caption heights is determined as the height of a corresponding row in the table. After the heights of the conference captions are determined, the heights of the rows of the table are determined, and at this time the heights of the rows of the table are not adjusted any more. The height of each row in the table is determined based on the height of the conference caption in the row, and then the width of the table is further determined (i.e. based on the caption width and the content width).

In some embodiments, determining the size of the conference information includes:

Firstly, the overall height of the conference information is determined according to the caption heights of the conference captions, wherein a height of the conference contents corresponding to each conference caption is the caption height of the conference caption. In an implementation, a sum of the caption heights of the conference captions is the overall height of the conference information. Optionally, the caption heights of the conference captions may be the same or different. The maximum caption height may be served as the caption height of each of the conference captions, or an average height of the caption heights may be served as the caption height of each of the conference captions, which is not limited in the embodiment.

Secondly, the overall width of the conference information is determined according to the maximum caption width, the maximum content width and the number of the pieces of conference information. In an implementation, since the conference captions are displayed in a single column, the overall width of the conference information=the maximum caption width+the maximum content width×the number of the pieces of conference information.

Finally, the size of the conference information is determined according to the overall width and the overall height.

Method 2c, the embodiment provides a method for updating the size of the conference information.

In some embodiments, after the size of the conference information is determined, that is, after the row height and the column width of the table for displaying the conference information is determined, the size of the conference information may be further updated according to a caption font and/or a content font set by a user, specifically the updating of the conference information includes:

Updating mode 1) updating the overall width of the conference information according to the received caption font of each conference caption input by a user.

In some embodiments, if the overall width of the caption font exceeds the caption width of the conference caption corresponding to the caption font, the caption width of the corresponding conference caption is increased, so that the caption font is completely displayed in the cell with the increased caption width. The maximum caption width is updated according to the increased caption width, and the overall width of the conference information is updated based on the updated maximum caption width.

In some embodiments, if the overall width of the caption font is lower than a preset percentage of the caption width of the conference caption corresponding to the caption font, the caption width of the corresponding conference caption is decreased, so that the decreased caption width matches with the overall width of the caption font. The maximum caption width is updated based on the decreased caption width, and the overall width of the conference information is updated based on the updated maximum caption width.

Updating mode 2) updating the overall width of the conference information according to the received content font of the conference content corresponding to each conference caption input by the user.

In some embodiments, if the entire width of the content font exceeds the content width of the conference content corresponding to the content font, the content width of the conference content corresponding to the content font is increased, so that the caption font is completely displayed in the cell with the increased content width. The maximum content width is updated based on the increased content width, and the overall width of the conference information is updated based on the updated maximum content width.

In some embodiments, if the overall width of the content font is lower than a preset percentage of the content width of the conference content corresponding to the content font, the content width of the corresponding conference content is decreased, so that the decreased content width matches with the overall width of the content font. The maximum content width is updated based on the decreased content width, and the overall width of the conference information is updated based on the updated maximum content width.

Updating mode 3) updating the overall width of the conference information according to the received caption font of each conference caption and the content font of the conference content corresponding to the conference caption that are input by the user.

The updating mode is a combination of the updating modes 1) and 2), and the specific implementation process of updating mode 3) may be referred to the above process, which will not be described herein again.

In the updating modes of the embodiment, the font size set by the user has the highest priority. When the size of the caption font and the size of the content font set by the user are not matched with the widths of the cells where the caption font and the content font are located, the widths of the cells are updated, the maximum width among the updated widths of the cells is determined as the column width of the table, and the overall width of the conference information is adjusted adaptively.

Updating mode 4) updating the caption height of each conference caption of the conference information according to the height of the first region and the overall height of the conference information.

In some embodiments, if the overall width of the conference information exceeds the width of the first region, the caption width of each conference caption is compressed according to a preset proportion, so that the overall width of the compressed overall width of the conference information matches with the width of the first region. The compression proportion is the same for the caption heights of the conference captions, i.e., equal-ratio compression. In an implementation, it is necessary to ensure that the overall height of the conference information is less than or equal to the height of the first region. As the number of rows where the conference captions are located increases, the height of each of the rows is automatically compressed.

Updating mode 5) updating the caption height of each conference caption of the conference information according to the height of the first region and the quantity of the conference captions in the conference information.

In some embodiments, if the quantity of conference captions in the conference information is smaller than a threshold of the conference captions (a caption threshold), the height of the first region is divided by the quantity of the conference captions to obtain average height of the conference captions. In an implementation, for example, when the quantity of conference captions is less than or equal to ten (i.e., 10) rows, the height of the first region is divided to obtain the height of each of the rows in which the conference captions are located.

Figures 9, 10:
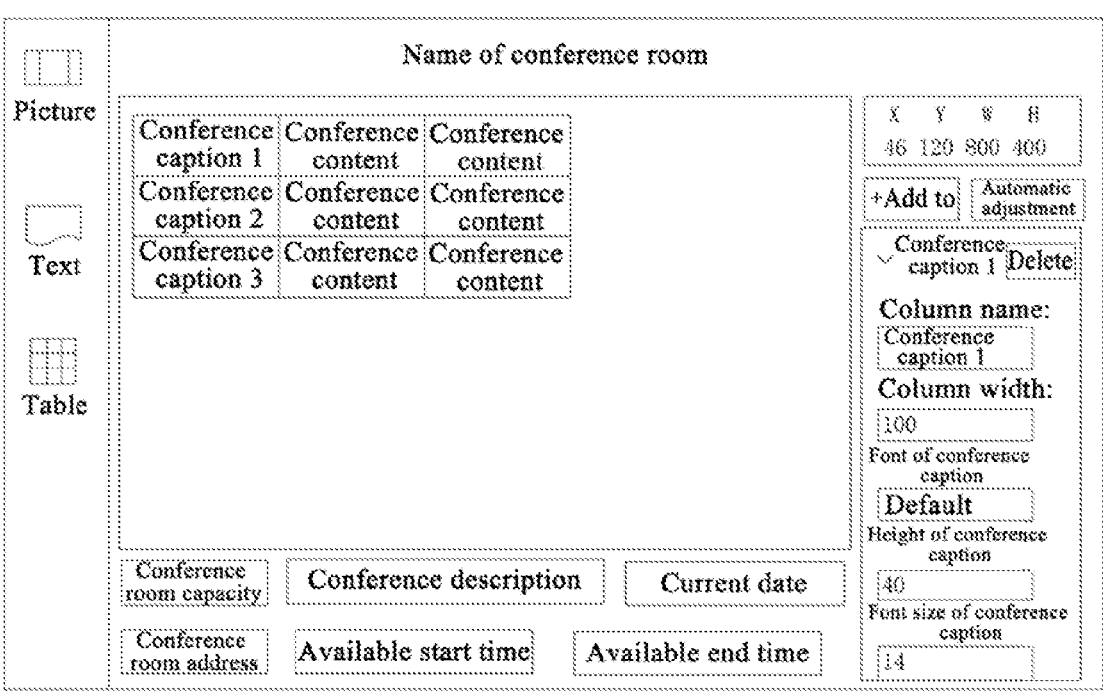
FIG. 9 is a schematic diagram showing an automatic adjustment according to an embodiment of the present disclosure.
FIG. 10 is a schematic diagram showing a conference configuration interface according to an embodiment of the present disclosure.

In some embodiments, the embodiment further provides an automatic adjustment manner, as shown in FIG. 9. An automatic adjustment button (i.e., a virtual button) is displayed on the conference configuration interface. The user may trigger the automatic adjustment button to implement the matching between the height of the first region and the overall height of the conference information.

In an implementation, after conference information to be displayed and the first region in the display region of the electronic sign are determined, updating, in response to an automatic adjustment instruction triggered by the user, the height of each conference caption in the conference information based on the height of the first region, so that the height of the first region is matched with the overall height of the conference information. The automatic adjustment mainly includes two modes, one of the two modes is to compress the caption width of each conference caption according to a preset ratio if the overall width of the conference information exceeds the width of the first region; and the other of the two modes is to divide the height of the first region by the quantity of the conference captions to obtain an average caption height of the conference captions if the quantity of the conference captions in the conference information is smaller than a threshold of the conference captions.

The updating modes 1) to 3) and the updating modes 4) to 5) in the embodiments may be implemented in a combined manner, that is, any one of the updating modes 1) to 3) is combined with the updating mode 4) or the updating mode 5), which is not limited in the embodiment.

Method 2d, the present embodiment provides a method for determining a threshold of the number of pieces of conference information that the first region is capable of accommodating.

In some embodiments, the threshold (i.e., the quantity threshold) of the number of pieces of conference information that the first region is capable of accommodating is determined according to the maximum caption width among the caption widths of the conference captions in the conference information, the maximum content width among the content widths of the conference contents corresponding to the conference captions, and the width of the first region.

In an implementation, the quantity threshold=(the width of the first region–the maximum caption width)/the maximum content width. If the obtained quantity threshold is decimal, the number after the decimal point is directly discarded, that is, the quantity threshold is rounded down to a whole number.

The calculation logic in the embodiment is as follows: the user adjusts the size of the first region in a dragging mode after pulling a grid control; after the user sets conference related information such as a row height, a column width, a font and a background of the table, the set conference related information is uploaded at a web terminal; at a service platform, the quantity of conference information that may be displayed in the first region is calculated by subtracting the caption height (i.e., the maximum caption height of the caption heights) from the height of the first region, and then by dividing the difference by the maximum content height of content heights of the conference contents. With the calculation rule of discarding numbers after the decimal point, the result is rounded down to obtain the quantity threshold.

As shown in FIG. 10, the present embodiment provides a conference configuration interface, which uses a new calculation logic and adds an automatic adjustment function and a linkage function of the font and data regarding the column width.

After the user selects the grid control, the user firstly needs to adjust the size of the first region in a mode of dragging or modifying parameters by using the toolbar on the right side; and then the user sets the column width and the row height of the conference caption and the conference content (i.e., the conference caption in a row and the conference content in the same row as the conference caption have the same row height), and finally the user sets the font sizes of the conference caption and the conference content. If the font size exceeds the preset width of the conference caption or the conference content, the value of the width of the conference caption or the conference content may be automatically modified, and the user may check the caption width or the content width on the right side of the conference configuration interface in real time. The grid control creates the entire table according to the number of the rows. For example, when it is default that the row height of the table is 160 and the width of the table is 40. When the number of the rows is less than or equal to 10, the height of the table and the height of the first region may be automatically matched by clicking the automatic adjusting button.

The second embodiment: based on the same inventive concept, an embodiment of the present disclosure further provides an electronic device. Since the electronic device is an electronic device in the method in the embodiments of the present disclosure, and a principle of the electronic device for solving the problem is similar to that of the method, the implementation of the electronic device may refer to the implementation of the method, and repeated contents will not be described again.

Figure 11:
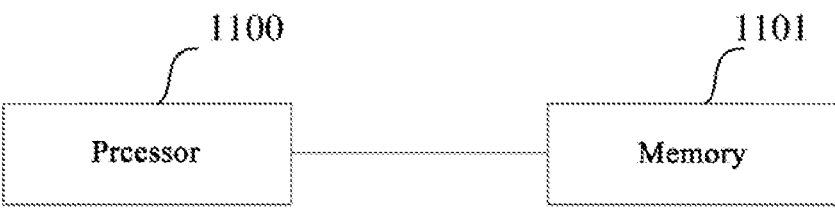
FIG. 11 is a schematic diagram showing an electronic device according to an embodiment of the present disclosure.

As shown in FIG. 11, the electronic device includes a processor 1100 and a memory 1101 for storing a program executable by the processor 1100, the processor 1100 is configured to read the program in the memory 1101 and executing the following steps:

Determining conference information to be displayed and a first region in a display region of an electronic sign, wherein the conference information includes conference captions and conference contents corresponding to the conference captions.

Determining a quantity threshold of pieces of the conference information that the first region is capable of accommodating according to the size of the conference information and the size of the first region.

If the number of the pieces of the conference information to be displayed exceeds the quantity threshold, selecting the pieces of conference information with a number is less than or equal to the quantity threshold from a conference information queue to be displayed, and displaying the selected pieces of conference information in the first region.

As an alternative embodiment, the processor 1100 is specifically configured to:

Determine the size of the conference information, according to the received caption widths and the caption heights of the conference captions and the content heights of the conference contents corresponding to the conference captions that are input by the user.

As an alternative embodiment, the processor 1100 is specifically configured to:

Determine an overall width of the conference information, according to the caption width of each conference caption, wherein the width of the conference content corresponding to each conference caption is the caption width of the conference caption;

Determine the overall height of the conference information, according to a maximum caption height, a maximum content height and the quantity of the conference information; and Determine the size of the conference information, according to the overall width and the overall height.

In an optional implementation, after determining the size of the conference information, the processor 1100 is specifically further configured to:

Update the overall height of the conference information, according to the received caption font of at least one conference caption input by the user; and/or Update the overall height of the conference information, according to the received content font of the conference content corresponding to the at least one conference caption input by the user.

As an alternative embodiment, the processor 1100 is specifically configured to:

If the overall height of the caption font input by the user exceeds the caption height of the conference caption corresponding to the caption font input by the user, increase the caption height of the conference caption corresponding to the caption font, so that the caption font is completely displayed in the cell with the increased caption height; or If the overall height of the caption font input by the user is lower than a preset percentage of the caption height of the conference caption corresponding to the caption font input by the user, decrease the caption height of the corresponding conference caption, so that the decreased caption height is matched with the overall height of the caption font.

As an alternative embodiment, the processor 1100 is specifically configured to:

If the overall height of the content font input by the user exceeds the content height of the conference content corresponding to the content font input by the user, increase the content height of the conference content corresponding to the content font, so that the caption font may be completely displayed in the cell with the increased content height; or If the overall height of the content font input by the user is lower than a preset percentage of the content height of the conference content corresponding to the content font input by the user, decrease the content height of the corresponding conference content, so that the decreased content height is matched with the overall height of the content font.

In an optional implementation, after determining the size of the conference information, the processor 1100 is specifically further configured to:

Update the caption width of each conference caption of the conference information according to the width of the first region and the overall width of the conference information; or Update the caption width of each conference caption of the conference information according to the width of the first region and the quantity of the conference captions in the conference information.

As an alternative embodiment, the processor 1100 is specifically configured to:

If the overall width of the conference information exceeds the width of the first region, compress the caption width of each conference caption according to a preset proportion, so that the overall width of the compressed conference information is matched with the width of the first region.

As an alternative embodiment, the processor 1100 is specifically configured to:

If the quantity of the conference captions in the conference information is smaller than a caption threshold, divide the width of the first region by the quantity of the conference captions to obtain the average caption width of the conference captions.

As an alternative embodiment, the processor 1100 is specifically configured to:

Determine a quantity threshold of pieces of the conference information that the first region is capable of accommodating, according to the maximum caption height of the caption heights of the conference captions in the conference information, the maximum content height of the content heights of the conference contents corresponding to the conference captions, and the height of the first region.

In an optional implementation, after determining the conference information to be displayed and the first region in the display region of the electronic sign, the processor 1100 is specifically further configured to:

In response to an automatic adjustment instruction triggered by a user, update the caption width of each conference caption in the conference information based on the width of the first region, so that the width of the first region is matched with the overall width of the conference information.

In an optional implementation, the conference information is displayed in a form of a table. The conference captions in the conference information are arranged in the same row and in different columns, and conference contents corresponding to the same conference caption are in the same column as the conference caption.

The row height of a row where the conference captions are located in the table is determined according to the maximum caption height of the caption heights of the conference captions. The height of the other cells in other rows of the table except the row where the conference captions are located is determined according to the maximum content height among the content heights of the conference contents in the other rows. The column width in the table is determined according to the caption widths of the conference captions.

As an alternative embodiment, the processor 1100 is specifically configured to:

Determine the size of the conference information according to the received caption heights and caption widths of the conference captions and the content widths of the conference contents corresponding to the conference captions that are input by the user.

As an alternative embodiment, the processor 1100 is specifically configured to:

Determine the overall height of the conference information according to the caption heights of the conference captions, wherein a height of the conference contents corresponding to each conference caption is the caption height of the conference caption.

Determine the overall width of the conference information according to the maximum caption width, the maximum content width and the number of pieces of the conference information.

Determine the size of the conference information according to the overall width and the overall height.

In an optional implementation, after determining the size of the conference information, the processor 1100 is specifically further configured to:

Update the overall width of the conference information according to the received caption font of the conference caption input by the user; and/or Update the overall width of the conference information according to the received content font of the conference content corresponding to the conference caption input by the user.

As an alternative embodiment, the processor 1100 is specifically configured to:

If the overall width of the caption font exceeds the caption width of the conference caption corresponding to the caption font, increase the caption width of the corresponding conference caption, so that the caption font is completely displayed in the cell with the increased caption width; or If the overall width of the caption font is lower than a preset percentage of the caption width of the conference caption corresponding to the caption font, decrease the caption width of the corresponding conference caption, so that the decreased caption width is matched with the overall width of the caption font.

As an alternative embodiment, the processor 1100 is specifically configured to:

If the overall width of the content font exceeds the content width of the conference content corresponding to the content font, increase the content width of the conference content corresponding to the content font, so that the caption fond is completely displayed in the cell with the increased content width; or If the overall width of the content font is lower than a preset percentage of the content width of the conference content corresponding to the content font, decrease the content width of the conference content corresponding to the content font, so that the decreased content width is matched with the overall width of the content font.

In an optional implementation, after determining the size of the conference information, the processor 1100 is specifically further configured to:

Update the caption height of each conference caption of the conference information according to the height of the first region and the overall height of the conference information; or Update the caption height of each conference caption of the conference information according to the height of the first region and the quantity of the conference captions in the conference information.

As an alternative embodiment, the processor 1100 is specifically configured to:

If the overall width of the conference information exceeds the width of the first region, compress the caption width of each conference caption according to a preset proportion, so that the overall width of the compressed conference information is matched with the width of the first region.

As an alternative embodiment, the processor 1100 is specifically configured to:

If the quantity of the conference captions in the conference information is smaller than a caption threshold, divide the height of the first region by the quantity of the conference captions to obtain the average caption height of the conference captions.

As an alternative embodiment, the processor 1100 is specifically configured to:

Determine a quantity threshold of the conference information that the first region is capable of accommodating, according to the maximum caption width of the caption widths of the conference captions in the conference information, the maximum content width of the content widths of the conference contents corresponding to the conference captions, and the width of the first region.

In an optional implementation, after determining the conference information to be displayed and the first region in the display region of the electronic sign, the processor 1100 is specifically further configured to:

In response to an automatic adjustment instruction triggered by a user, update the caption height of each conference caption in the conference information based on the height of the first region, so that the height of the first region is matched with the overall height of the conference information.

In an optional implementation, the conference information is displayed in a form of a table. The conference captions in the conference information are arranged in the same column and in different rows, and conference content corresponding to each conference caption is in the same row as the conference caption.

The column width of a column in which the conference captions are located in the table is determined according to the maximum caption width of the caption widths of the conference captions. The width of the other cells in other columns of the table except the column where the conference captions are located is determined according to the maximum content width among the content widths of the conference contents in the other columns. The row height in the table is determined based on the caption heights of the conference captions.

As an alternative embodiment, the processor 1100 is specifically configured to:

Periodically remove the finished conference information from a conference information queue to be displayed.

Select pieces of the conference information with a number less than or equal to the quantity threshold and with the higher ranking in the conference start time from the remaining conference information queue and display the selected pieces of conference information in the first region.

As an alternative embodiment, the processor 1100 is specifically configured to:

Determine the size of the first region according to the received height and the width of the first region input by a user; or In response to a drag operation instruction on the first region from a user, determine the size of the first region according to the preset initial size of the first region and the scaling corresponding to the drag operation instruction.

The third embodiment: based on the same inventive concept, an embodiment of the present disclosure further provides an apparatus for displaying an electronic sign. Since the apparatus is an apparatus used in the method in the embodiment of the present disclosure, the principle of the apparatus for solving the problem is similar to that of the method, the implementation of the apparatus may refer to the implementation of the method, and repeated descriptions are omitted.

Figure 12:
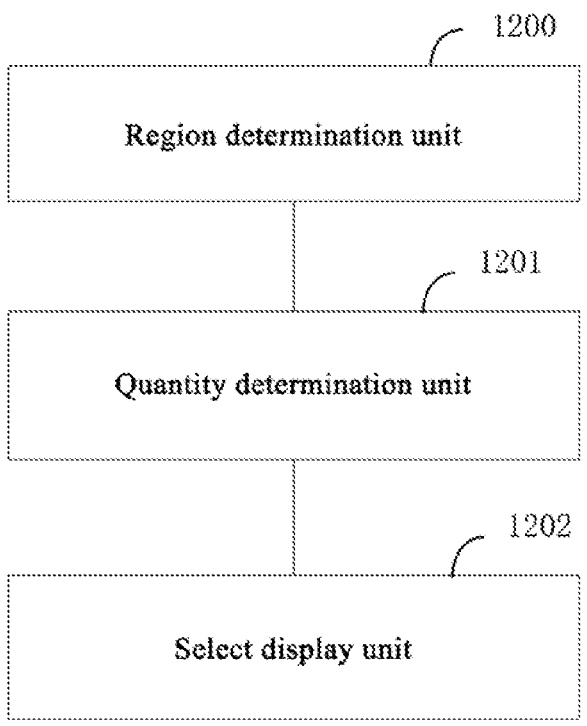
FIG. 12 is a schematic diagram showing of an apparatus for displaying an electronic sign according to an embodiment of the present disclosure.

As shown in FIG. 12, the apparatus includes a region determination unit 1200, a quantity determination unit 1201, and a selection display unit 1202.

The region determination unit 1200 is configured to determine conference information to be displayed and a first region in a display region of an electronic sign, where the conference information includes conference captions and conference contents corresponding to the conference captions.

The quantity determination unit 1201 is configured to determine a quantity threshold of pieces of conference information that the first region is capable of accommodating according to the size of the conference information and the size of the first region.

The selection display unit 1202 is configured to select, if the number of the pieces of conference information to be displayed exceeds the quantity threshold, pieces of conference information with a number smaller than or equal to the quantity threshold from the conference information queue to be displayed, and display the selected pieces of conference information in the first region.

In an optional implementation, the quantity determination unit 1201 is specifically configured to:

Determining the size of the conference information according to the received caption widths and the caption heights of the conference captions and the content heights of the conference contents corresponding to the conference captions that are input by the user.

In an optional implementation, the quantity determination unit 1201 is specifically configured to:

Determine the overall width of the conference information according to the caption widths of the conference captions, wherein the width of the conference content corresponding to each conference caption is the caption width of the conference caption;

Determine the overall height of the conference information according to the maximum caption height, the maximum content height and the quantity of the conference information; and Determine the size of the conference information according to the overall width and the overall height.

In an optional implementation, after determining the size of the conference information, the apparatus further includes a first updating unit specifically configured to:

Update the overall height of the conference information according to the received caption font of at least one conference caption input by the user; and/or Update the overall height of the conference information according to the received content font of the conference content corresponding to the at least one conference caption input by the user.

In an optional implementation, the first updating unit is specifically configured to:

If the overall height of the caption font input by the user exceeds the caption height of the conference caption corresponding to the caption font input by the user, increase the caption height of the conference caption corresponding to the caption font, so that the caption font is completely displayed in the cell with the increased caption height; or If the overall height of the caption font input by the user is lower than a preset percentage of the caption height of the conference caption corresponding to the caption font input by the user, decrease the caption height of the corresponding conference caption, so that the decreased caption height is matched with the overall height of the caption font.

In an optional implementation, the first updating unit is specifically configured to:

If the overall height of the content font input by the user exceeds the content height of the conference content corresponding to the content font input by the user, increase the content height of the conference content corresponding to the content font, so that the caption font is completely displayed in the cell with the increased content height; or If the overall height of the content font input by the user is lower than a preset percentage of the content height of the conference content corresponding to the content font input by the user, decrease the content height of the corresponding conference content, so that the decreased content height is matched with the overall height of the content font.

In an optional implementation, after determining the size of the conference information, the apparatus further includes a second updating unit configured to:

Update the caption width of each conference caption of the conference information according to the width of the first region and the overall width of the conference information; or Update the caption width of each conference caption of the conference information according to the width of the first region and the quantity of the conference captions in the conference information.

In an optional implementation, the second updating unit is specifically configured to:

If the overall width of the conference information exceeds the width of the first region, compress the caption width of each conference caption according to a preset proportion, so that the overall width of the compressed conference information is matched with the width of the first region.

In an optional implementation, the second updating unit is specifically configured to:

If the quantity of the conference captions in the conference information is smaller than a caption threshold, divide the width of the first region by the quantity of the conference captions to obtain the average caption width of the conference captions.

In an optional implementation, the quantity determination unit 1201 is specifically configured to:

Determine a quantity threshold of the conference information that are capable of being contained in the first region, according to the maximum caption height of the caption heights of the conference captions in the conference information, the maximum content height of the content heights of the conference contents corresponding to the conference captions, and the height of the first region.

In an optional implementation, after determining the conference information to be displayed and the first region in the display region of the electronic sign, the apparatus further includes an automatic adjusting unit configured to:

In response to an automatic adjustment instruction triggered by a user, update the caption width of each conference caption in the conference information based on the width of the first region, so that the width of the first region is matched with the overall width of the conference information.

In an optional implementation, the conference information is displayed in a form of a table, the conference captions in the conference information are distributed in the same row and in different columns. The conference contents corresponding to each conference caption are in the same column as the conference caption.

The row height of the conference caption in the table is determined according to the maximum caption height of the caption heights of the conference captions. The height of the other cells in other rows of the table except the row where the conference captions are located is determined according to the maximum content height among the content heights of the conference contents in the other rows. The column width in the table is determined according to the caption width of each conference caption.

In an optional implementation, the quantity determination unit 1201 is specifically configured to:

Determine the size of the conference information according to the received caption heights and caption widths of the conference captions and the content widths of the conference contents corresponding to the conference captions that are input by the user.

In an optional implementation, the quantity determination unit 1201 is specifically configured to:

Determine the overall height of the conference information according to the caption heights of the conference captions, wherein a height of the conference contents corresponding to each conference caption is the caption height of the conference caption;

Determine the overall width of the conference information according to the maximum caption width, the maximum content width and the number of the pieces of conference information; and Determine the size of the conference information according to the overall width and the overall height.

In an optional implementation, after determining the size of the conference information, the apparatus further includes a first updating unit specifically configured to:

Update the overall width of the conference information according to the received caption font of each conference caption input by the user; and/or Update the overall width of the conference information according to the received content font of the conference content corresponding to each conference caption input by the user.

In an optional implementation, the first updating unit is specifically configured to:

If the overall width of the caption font exceeds the caption width of the conference caption corresponding to the caption font, increase the caption width of the corresponding conference caption, so that the caption font is completely displayed in a cell with the increased caption width of the conference caption; or If the overall width of the caption font is lower than a preset percentage of the caption width of the conference caption corresponding to the caption font, decrease the caption width of the corresponding conference caption, so that the decreased caption width is matched with the overall width of the caption font.

In an optional implementation, the first updating unit is specifically configured to:

If the overall width of the content font exceeds the content width of the conference content corresponding to the content font, increase the content width of the conference content corresponding to the content font, so that the caption font is completely displayed in a cell with the increased content width; or If the overall width of the content font is lower than a preset percentage of the content width of the conference content corresponding to the content font, decrease the content width of the conference content corresponding to the content font, so that the decreased content width is matched with the overall width of the caption font.

In an optional implementation, after determining the size of the conference information, the apparatus further includes a second updating unit configured to:

Update the caption height of each conference caption of the conference information according to the height of the first region and the overall height of the conference information; or Update the caption height of each conference caption of the conference information according to the height of the first region and the quantity of the conference captions in the conference information.

In an optional implementation, the second updating unit is specifically configured to:

If the overall width of the conference information exceeds the width of the first region, compress the caption width of each conference caption according to a preset proportion, so that the overall width of the compressed conference information is matched with the width of the first region.

In an optional implementation, the second updating unit is specifically configured to:

If the quantity of the conference captions in the conference information is smaller than a caption threshold, divide the height of the first region by the quantity of the conference captions to obtain the average caption height of the conference captions.

In an optional implementation, the quantity determination unit 1201 is specifically configured to:

Determine a quantity threshold of the conference information that is capable of being contained in the first region according to the maximum caption width of the caption widths of all conference captions in the conference information, the maximum content width of the content widths of all conference contents corresponding to all conference captions, and the width of the first region.

In an optional implementation, after determining the conference information to be displayed and the first region in the display region of the electronic sign, the apparatus further includes an automatic adjusting unit configured to:

In response to an automatic adjustment instruction triggered by a user, update the caption height of each conference caption in the conference information based on the height of the first region, so that the height of the first region is matched with the overall height of the conference information.

In an optional implementation, the conference information is displayed in a form of a table, the conference captions in the conference information are distributed in the same column and in different rows. The conference contents corresponding to each conference caption are in the same row as the conference caption.

The column width of the column in which the conference captions are located in the table is determined according to the maximum caption width of the caption widths of the conference captions. The width of the other cells in other rows of the table except the column where the conference captions are located is determined according to the maximum content width among the content widths of the conference contents in the other rows. The row height in the table is determined by the caption height of each conference caption.

In an optional implementation, the selection display unit 1202 is specifically configured to:

Periodically remove the finished conference information from a conference information queue to be displayed; and Select the pieces of conference information with a number less than or equal to the quantity threshold and with the higher ranking in the conference start time from the remaining conference information queue, and display the selected pieces of conference information in the first region.

In an optional implementation, the quantity determination unit 1201 is specifically configured to:

Determine the size of the first region according to the received height and width of the first region input by a user; or In response to a drag operation instruction on the first region from a user, determine the size of the first region according to the preset initial size of the first region and the scaling corresponding to the drag operation instruction.

Based on the same inventive concept, an embodiment of the present disclosure also provides a non-transitory computer storage medium having a computer program stored thereon, where the program, when executed by a processor, causes the processor to:

Determine conference information to be displayed and a first region in a display region of an electronic sign, wherein the conference information includes conference captions and conference contents corresponding to the conference captions;

Determine a quantity threshold of the conference information being capable of being contained in the first region according to the size of the conference information and the size of the first region; and If the quantity of the conference information to be displayed exceeds the quantity threshold, select the pieces of conference information with a number less than or equal to the quantity threshold from the conference information queue to be displayed, and display the selected pieces of conference information in the first region.

As will be appreciated by one of skilled in the art, the embodiments of the present disclosure may provide a method, system, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable storage media (including, but not limited to, disk storage, optical storage, and the like) having computer-usable program code embodied therein.

The present disclosure is described with reference to flowchart and/or block diagrams of methods, apparatus (systems), and computer program products according to the embodiments of the present disclosure. It will be understood that each flow and/or each block of the flowchart and/or block diagrams, and combinations of flows and/or blocks in the flowchart and/or block diagrams, may be implemented by computer program instructions. These computer program instructions may be provided to a processor of a general purpose computer, special purpose computer, embedded processor, or other programmable data processing apparatus to produce a machine, such that the instructions, which are executed via the processor of the computer or other programmable data processing apparatus, create means for implementing the functions specified in one or more flows in the flowchart and/or one or more blocks in the block diagram.

These computer program instructions may also be stored in a computer-readable memory that can direct a computer or other programmable data processing apparatus to function in a particular manner, such that the instructions stored in the computer-readable memory produce products including instruction means which implement the functions specified in the one or more flows in the flowchart and/or one or more blocks in the block diagram.

These computer program instructions may also be loaded onto a computer or other programmable data processing apparatus to cause a series of operational steps to be performed on the computer or other programmable apparatus, so as to produce a computer implemented process, such that the instructions which are executed on the computer or other programmable apparatus provide steps for implementing the functions specified in one or more flows in the flowchart and/or one or more blocks in the block diagram.

It will be apparent to one of skilled in the art that variations and modifications may be made to the present disclosure without departing from the spirit and scope of the present disclosure. Thus, it is intended that the present disclosure also encompass such modifications and variations as fall within the scope of the claims and their equivalents.

What is claimed is:

1. A method for displaying an electronic sign, comprising:
    determining conference information to be displayed and a first region in a display region of the electronic sign, wherein the conference information comprises conference captions and conference contents corresponding to the conference captions;

determining a quantity threshold of pieces of conference information being capable of being contained in the first region according to a size of the conference information and a size of the first region; and in response to the number of pieces of conference information to be displayed exceeding the quantity threshold, selecting pieces of conference information with a number less than or equal to the quantity threshold from a conference information queue to be displayed, and displaying the selected pieces of conference information in the first region, wherein the size of the conference information is determined according to received caption widths and caption heights of the conference captions and content heights of the conference contents corresponding to the conference captions input by a user.

2. The method of claim 1, wherein the determining the size of the conference information comprises:
    determining an overall width of the conference information according to the caption widths of the conference captions, wherein a width of the conference content corresponding to each conference caption is the caption width of the conference caption;
    determining an overall height of the conference information according to a maximum caption height, a maximum content height and the number of the pieces of conference information; and
    determining the size of the conference information according to the overall width and the overall height.

3. The method of claim 1, wherein after the determining the size of the conference information, the method further comprises:
    updating the overall height of the conference information according to the received caption font of at least one conference caption input by the user; and/or
    updating the overall height of the conference information according to the received content font of the conference content corresponding to at least one conference caption input by the user.

4. The method of claim 3, wherein the updating the overall height of the conference information according to the received caption font of the at least one conference caption input by the user comprises:
    in response to an overall height of the caption font input by the user exceeding the caption height of the conference caption corresponding to the caption font input by the user, increasing the caption height of the corresponding conference caption, so that the caption font is completely displayed in a cell with the increased caption height; or
    in response to the overall height of the caption font input by the user being lower than a preset percentage of the caption height of the conference caption corresponding to the caption font input by the user, decreasing the caption height of the corresponding conference caption, so that the decreased caption height is matched with the overall height of the caption font.

5. The method of claim 3, wherein the updating the overall height of the conference information according to the received content font of the conference content corresponding to at least one conference caption input by the user comprises:
    in response to an overall height of the content font input by the user exceeding the content height of the conference content corresponding to the content font input by the user, increasing the content height of the corresponding conference content, so that the caption font is completely displayed in a cell with the increased content height; or in response to the overall height of the content font input by the user being lower than a preset percentage of the content height of the conference content corresponding to the content font input by the user, decreasing the content height of the corresponding conference content, so that the decreased content height is matched with the overall height of the caption font.

6. The method of claim 1, wherein after the determining the size of the conference information, the method further comprises:

updating the caption width of each conference caption of the conference information according to a width of the first region and the overall width of the conference information; or updating the caption width of each conference caption of the conference information according to the width of the first region and a quantity of the conference captions in the conference information.

7. The method of claim 6, wherein the updating the caption width of each conference caption of the conference information according to the width of the first region and the overall width of the conference information comprises:

in response to the overall width of the conference information exceeding the width of the first region, compressing the caption width of each conference caption according to a preset proportion, so that the overall width of the compressed conference information is matched with the width of the first region.

8. The method of claim 6, wherein the updating the caption width of each conference caption of the conference information according to the width of the first region and quantity of the conference captions in the conference information comprises:

in response to the quantity of the conference captions in the conference information being less than a caption threshold, dividing the width of the first region by the quantity of the conference captions to obtain an average caption width of the conference captions.

9. The method of claim 1, wherein the determining the quantity threshold of the pieces of conference information being capable of being contained in the first region according to the size of the conference information and the size of the first region comprises:

determining the quantity threshold of the pieces of conference information being capable of being contained in the first region, according to a maximum caption height of the caption heights of the conference captions in the conference information, a maximum content height of the content heights of the conference contents corresponding to the conference captions, and a height of the first region.

10. The method of claim 1, wherein after the determining the conference information to be displayed and the first region in the display region of the electronic sign, the method further comprises:

in response to an automatic adjustment instruction triggered by a user, updating the caption width of each conference caption in the conference information based on a width of the first region, so that the width of the first region is matched with an overall width of the conference information.

11. The method of claim 1, wherein the conference information is displayed in form of a table, the conference captions in the conference information are distributed in a same row and in different columns, and the conference contents corresponding to the same conference caption are in the same column as the conference caption; wherein a row height of the conference caption in the table is determined according to a maximum caption height of caption heights of the conference captions; the width of the other cells in other rows of the table except the row where the conference captions are located is determined according to a maximum content width of the content widths of the conference contents in the other rows; and a column width in the table is determined according to the caption width of each conference caption.

12. The method of claim 1, wherein the selecting the pieces of conference information with the number less than or equal to the quantity threshold from the conference information queue to be displayed, and the displaying the selected pieces of conference information in the first region comprises:

removing the finished conference information from the conference information queue to be displayed according to a preset period; and selecting the pieces of conference information with a number less than or equal to the quantity threshold and with the higher ranking in the conference start time from the remaining conference information queue and displaying the selected conference information in the first region.

13. The method of claim 1, wherein determining the size of the first region comprises:

determining the size of the first region according to a received height and a width of the first region input by a user; or in response to a drag operation instruction on the first region from a user, determining the size of the first region according to a preset initial size of the first region and a scaling corresponding to the drag operation instruction.

14. An electronic device, comprising a processor and a memory; wherein the memory is configured to store programs executable by the processor, the processor is configured to read the programs in the memory and execute steps of the method of claim 1.

15. A non-transitory computer storage medium having a computer program stored thereon, wherein the program, when executed by a processor, implements steps of the method of claim 1.

* * * * *